US012784671B2

(12) United States Patent
Tye et al.

(10) Patent No.: US 12,784,671 B2
(45) Date of Patent: Nov. 3, 2026

(54) SYSTEM AND METHOD OF TIMING EXECUTION OF A DIGITAL DISPLAY DEVICE PROTECTIVE COMPENSATION PROCESS TO COINCIDE WITH PREDICTED PERIODS OF USER INACTIVITY

(71) Applicant: Dell Products LP, Round Rock, TX (US)

(72) Inventors: Bee June Tye, Singapore (SG); Yu Wei-Kuo, Singapore (SG); Seow Kwang Steven Foo, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 19/024,947

(22) Filed: Jan. 16, 2025

(65) Prior Publication Data

US 2026/0204209 A1 Jul. 16, 2026

(51) Int. Cl.
*G09G 3/3208* (2016.01)
*G09G 3/00* (2006.01)

(52) U.S. Cl.
CPC ........... *G09G 3/3208* (2013.01); *G09G 3/006* (2013.01); *G09G 2340/04* (2013.01)

(58) Field of Classification Search
CPC ........... G09G 3/3233; G09G 2320/043; G09G 2300/0842; G09G 2320/0233; G09G 2320/0295; G09G 2300/0819; G09G 2320/046; G09G 2320/029; G09G 2320/045; G09G 2320/0242; G09G 2320/0626; G09G 2320/0686; G09G 3/3208
See application file for complete search history.

(56) References Cited

U.S. PATENT DOCUMENTS

| | | | | |
|---|---|---|---|---|
| 6,081,752 | A * | 6/2000 | Benson, IV | G06F 1/26 713/340 |
| 7,696,773 | B2 | 4/2010 | Levey | |
| 8,194,063 | B2 | 6/2012 | Levey | |
| 10,475,417 | B2 | 11/2019 | Jiang | |
| 10,699,648 | B2 | 6/2020 | Chaji | |
| 10,706,774 | B2 | 7/2020 | Lee | |
| 10,747,263 | B2 | 8/2020 | Aurongzeb | |

(Continued)

*Primary Examiner* — Sujit Shah
(74) *Attorney, Agent, or Firm* — Prol Intellectual Property Law, PLLC; H. Kenneth Prol

(57) ABSTRACT

A organic light emitting diode (OLED) digital display device operating a firmware level digital display device protective compensation process activity determination system may comprise a hardware processor executing machine readable code instructions to periodically gather pixel value data in pixel grid zones that each comprise a plurality of pixels to determine changes in zone wide pixel value averages for each of the pixel grid zones as a measure of OLED display screen panel activity, and automatically trigger a digital display device protective compensation system to adjust and modify degraded pixels for the OLED digital display device when the changes in zone wide pixel value averages for the pixel grid zones does not meet or exceed an average pixel value change threshold value or aborts the digital display device protective compensation if exceeded. The digital display device protective compensation system may be scheduled during a predicted input/output device inactivity window.

20 Claims, 9 Drawing Sheets

(56) References Cited

U.S. PATENT DOCUMENTS

| | | | | | |
|---|---|---|---|---|---|
| 11,164,285 | B2 | 11/2021 | Kim | | |
| 2014/0176802 | A1* | 6/2014 | Yu | H04N 21/8456 | 348/700 |
| 2014/0375704 | A1* | 12/2014 | Bi | G09G 3/3275 | 345/694 |
| 2018/0261151 | A1* | 9/2018 | Chung | G09G 3/20 | |
| 2022/0358877 | A1* | 11/2022 | Hack | G06V 10/82 | |
| 2023/0342618 | A1* | 10/2023 | Dangi | G06N 3/088 | |

* cited by examiner

SYSTEM AND METHOD OF TIMING EXECUTION OF A DIGITAL DISPLAY DEVICE PROTECTIVE COMPENSATION PROCESS TO COINCIDE WITH PREDICTED PERIODS OF USER INACTIVITY

FIELD OF THE DISCLOSURE

The present disclosure generally relates to organic light-emitting diode (OLED) digital display devices that routinely execute digital display device protective compensation processes in which an OLED display screen panel for the digital display is powered down and OLED cell colors changed for brief periods of time to prevent damage to the OLED digital display device from prolonged use, such as with a burn-in effect. The present disclosure more specifically relates to executing machine readable code instructions of an operating system (OS) level digital display device protective compensation process activity determination system to work in tandem with a scaler hardware controller of an OLED digital display device executing code instructions of a firmware level digital display device protective compensation process activity determination system to direct execution of such a protective compensation process only during predicted periods of user inactivity and detected display panel inactivity.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
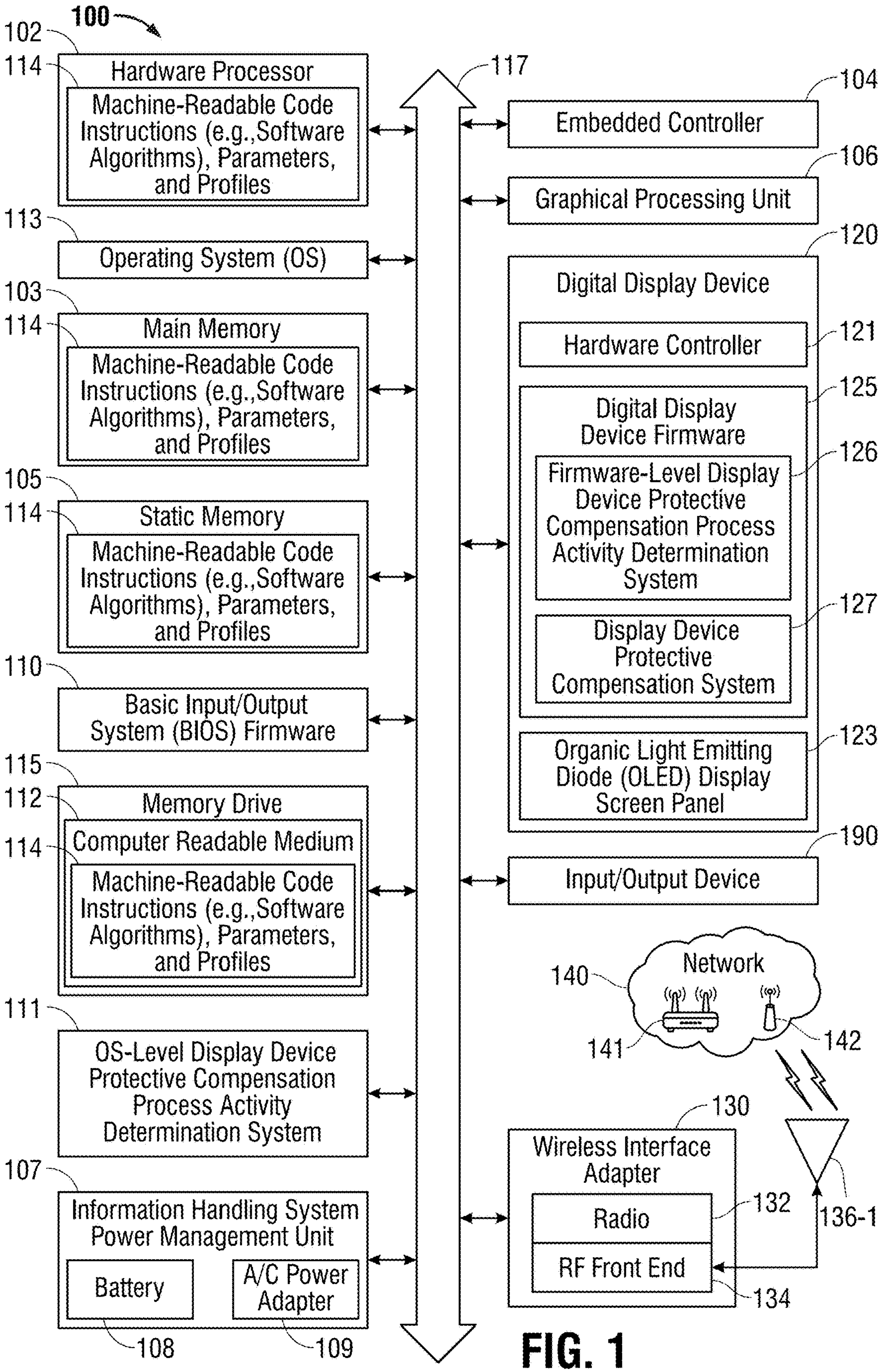
FIG. 1 is a block diagram illustrating an information handling system executing machine readable code instructions at an operating system (OS) level working in tandem with an organic light-emitting diode (OLED) digital display device executing a protective compensation process at a firmware level to adjust current to pixels to even out degraded pixels of the OLED digital display device and prevent or correct damage to the OLED digital display device due to prolonged use according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Digital display devices, such as organic light-emitting diode (OLED) digital display devices having OLED display screens, for example, operatively coupled to information handling systems that undergo prolonged active use in which certain pixels remain powered on at the same voltage for long periods may be at risk for damage or degradation of those pixels of the OLED display screen. Such damage may include a "burn-in" effect in which thin film transistors (TFTs) of the OLED digital display device powering a group of pixels that display a static image for long periods of time become increasingly less responsive to voltage changes prompting changes in brightness and color values at those pixels. This may result in those pixels continuing to display a "ghost" image despite receiving instructions to change their pixel values to display another image or a blank screen. For example, a band of color (including black) or framing displayed above or below a wide screen formatted video stream, or to either side of a portion screen formatted video stream, or various icons on an operating system (OS) home screen for long durations of time may cause distortion of later display of other images due to damage of the pixels' responsiveness to voltage or current from TFTs powering those pixels within these areas (e.g., above, below, or to either side of a framed video stream, or of an OS icon) due to extended use within a static image (e.g., as a frame or as an icon). In order to prevent such a burn-in effect, or lessen damage caused by such static image display, many OLED digital display devices, including computer monitors, televisions (TVs), digital billboards, and smart phones with OLED display screen panels, for example, are programmed to detect brightness degradation or decreased pixel responsiveness to current or voltage across pixels, and adjust current to pixels to even out degraded pixels for their respective display panels in routinely occurring time periods during a process referred to herein as a digital display protective compensation process.

During execution of such a digital display protective compensation process, OLED digital display devices may be placed in a standby mode and become unavailable for use by a user. This may negatively impact user experience if performed while the user is actively using the OLED digital display device. In some cases, users may be warned prior to execution of such a digital display protective compensation process and given a chance to delay or skip execution of the process. This warning process itself may negatively impact user experience by distracting the user routinely and repeatedly. In other cases, users may permanently disable automatic execution of the digital display protective compensation process. In such cases, the user may repeatedly delay or skip execution of the digital display protective compensation process enough times to inadvertently allow more permanent damage to the display screen to occur, even though such damage is meant to be avoided through use of the digital display protective compensation process. A system is needed to automatically schedule or trigger execution of the digital display protective compensation process during periodic times of user inactivity, when placing the OLED display screen panel for the digital display device in a standby mode and adjusting current to pixels to even out degraded pixels does not negatively impact the user experience or repeatedly distract the user with unwanted prompts or warnings.

In embodiments of the present disclosure, a firmware level digital display device protective compensation process activity determination system operating as firmware of an OLED digital display device may work alone or in tandem with an OS level digital display device protective compensation process activity determination system executing at an information handling system operatively coupled to the OLED digital display device to address these issues. A hardware processor executing machine readable code instructions of the OS level digital display device protective compensation process activity determination system may predict future occurrence of user inactivity based on predicted future use of input/output (IO) devices. The same or a different hardware processor, such as a scaler hardware controller, a tuning hardware controller (TCON) or other hardware controller executing machine readable code instructions of the firmware level digital display device protective compensation process activity determination system may sense user inactivity in real time based on how much or how little the image being displayed at a display device has changed over a recent time period. This may indicate that the user is not currently using software applications that reflect changes on the display device screen, such as by editing a document, or watching a moving video of any kind.

The digital display protective compensation process that requires suspending regular operation of the OLED display screen panel by placing it in a standby mode to identify degraded pixels and adjust current or voltage to compensate those pixels for the digital display may be performed in some embodiments when it is predicted, through execution of machine readable code instructions for the OS level digital display device protective compensation process activity determination system, that IO devices will not be used for a predicted time period. This predicted time period may be as long or longer than the time needed for the digital display protective compensation process to be completed. In further embodiments, the digital display device protective compensation process may not be executed unless it is determined through execution of machine readable code instructions for the firmware level digital display device protective compensation process activity determination system that the pixel values dictating the image displayed on the screen have changed by a value that is below a maximum allowed user activity threshold, indicating that the image has been static and the user is not currently using the digital display. Performing the method of the OS level digital display device protective compensation process activity determination system alone may prompt execution of the digital display device protective compensation process when IO devices are inactive, without determining whether the user is passively watching a video stream that does not require IO device interaction, however causing a problem for the user. On the other hand, performing the method of the firmware level digital display device protective compensation process activity determination system may prompt execution of the digital display device protective compensation process on any one of a plurality of digital display devices displaying an extended desktop, if one of those monitors is not being actively used through detection of change in pixel values of the OLED display screen panels for those digital display devices. However, this latter system may not provide predictive periods of inactivity and does not account for a situation where plural digital display devices are used in an extended desktop such that activity at the operatively coupled information handling system would need to avoid sending any of the plural digital display devices into standby for the digital display device protective compensation process while a user is active in front of the extended desktop. By combining both of these methods together, such one or more digital display devices may not be placed in standby mode for execution of the digital display device protective compensation system if any IO device or other OLED display screen panel is being used at the information handling system and, thus, a digital display device displaying a video stream may not be placed in standby mode despite the lack of IO device activity.

A hardware processor of an information handling system executing one or more software applications of an operating system that is operatively coupled to one or more OLED digital display devices may prompt execution by one or more protective compensation processes of such OLED digital display devices to suspend regular operation of the OLED display screen panel by placing it in a standby mode to identify degraded pixels, adjust current or voltage to compensate those pixels of the OLED digital display device and prevent damage to the OLED digital display device due to prolonged use when predicted periods of user inactivity are predicted, as indicated by predicted periods of inactivity for all operatively coupled IO devices. Additionally, current OLED display screen activity may be monitored via firmware executing on-board the OLED digital display device in embodiments herein.

For example, a hardware processor of the information handling system may execute machine readable code instructions of the OS level digital display device protective compensation process activity determination system to predict a future time period in which one or more operatively coupled IO devices, such as a mouse, trackpad, touchpad, or keyboard of an information handling system will be inactive based on historically gathered IO device activity measurements for those devices. This may involve inputting current or recent measurements for IO device activity for all operatively coupled devices into a predictive model trained on the historical IO device activity measurements for those devices, to output a predicted future time window in which those IO devices will not be in use. This may be an indication of future user inactivity in which a digital display protective compensation process may be executed by the OLED digital display device without impacting user experience. When such a time window has been predicted, the hardware processor for the information handling system may execute machine readable code instructions of the OS level digital display device protective compensation process activity determination system to notify the firmware level digital display device protective compensation process activity determination system that the user is expected to be inactive during that time period, triggering execution of the digital display protective compensation process by the scaler hardware controller of the digital display device.

Upon receipt of such a notification of a predicted window of user inactivity in embodiments herein, the scaler hardware controller or other hardware controller of the OLED digital display device may execute machine readable code instructions of the firmware level digital display device protective compensation process activity determination system to further ensure current user inactivity, such as no passive use of the OLED digital display device, prior to execution of the display device protective compensation process. This may be performed in order to avoid disruption in passive use of the OLED digital display device, such as when the user is viewing a video stream (e.g., watching TV or a movie), but is not currently using IO devices. A scaler hardware controller of the OLED digital display device or of the information handling system may execute machine readable code instructions of a firmware level digital display device protective compensation process activity determination system in embodiments herein to perform a digital display protective compensation process to adjust current to pixels to even out degraded pixels of the OLED digital display device and prevent damage to the OLED digital display device due to prolonged use only during predicted periods of user inactivity, as indicated by static display of images according to an embodiment of the present disclosure.

A scaler hardware controller may execute machine readable code instructions of the firmware level digital display device protective compensation process activity determination system, via a scaler hardware controller, to determine when one or more groups of pixels for the digital display are displaying a static image for a prolonged period of time, indicating user inactivity in which a digital display device protective compensation process may be performed without impacting user experience. For example, such a scaler hardware controller may execute machine readable code instructions of the firmware level digital display device protective compensation process activity determination system may determine when one or more groups of pixels for the digital display are displaying a static screen saver between framing displayed above or below in a wide screen format, or to either side in a portrait screen format, or various icons on an operating system (OS) home screen. In such a way, the information handling system executing machine readable code instructions of the OS level digital display device protective compensation process activity determination system working in tandem with an OLED digital display device executing at code instructions of the firmware level digital display device protective compensation process activity determination system may direct execution of a protective compensation process to suspend regular operation of the OLED display screen panel by placing it in a standby mode to identify degraded pixels and adjust current or voltage to compensate those pixels of the OLED digital display device and prevent damage to the OLED digital display device due to prolonged use only during periods of user inactivity in which a digital display device protective compensation process may be performed without impacting user experience.

Turning now to the figures, FIG. 1 illustrates an information handling system 100 similar to the information handling systems according to several aspects of the present disclosure. As described herein, organic light-emitting diode (OLED) digital display devices 120, for example, operatively coupled to information handling systems 100 that undergo prolonged active use in which the OLED display screen panel 123 of the OLED digital display device 120 remains powered on for long periods may be at risk for damage to the display screen. Such damage may include a "burn-in" effect in which thin film transistors (TFT) of the OLED digital display device 120 powering a group of pixels that display a static image for long periods of time on the OLED display screen panel 123 become increasingly less responsive to voltage changes prompting changes in brightness and color values at those pixels. This may result in those pixels continuing to display "ghost" images despite receiving instructions to change their pixel values to display another image or a blank screen. In order to prevent such a burn-in effect, or lessen damage caused by such static image display, many OLED digital display devices 120, including computer monitors, televisions (TVs), digital billboards, and smart phones with OLED display screen panels 123, for example, are programmed to adjust current to pixels to even out degraded pixels of the OLED display screen panel 123 in routinely occurring time periods during a process referred to herein as a digital display protective compensation process. This digital display protective compensation process is performed by a scaler hardware controller 121 executing machine readable code instructions of a display device protective compensation process system 127.

During execution of such a digital display protective compensation process by a scaler hardware controller 121 executing machine readable code instructions of a display device protective compensation process system 127, OLED digital display devices 120 may be placed in a standby mode and become unavailable for use by a user. This may negatively impact user experience if performed while the user is actively using the OLED digital display device 120. In some cases, users may be warned prior to execution of such a digital display protective compensation process and given a chance to delay or skip performance of the process by the scaler hardware controller 121 executing machine readable code instructions of a display device protective compensation process system 127. This warning process itself may negatively impact user experience by distracting the user routinely and repeatedly. In other cases, users may permanently disable automatic execution of the digital display protective compensation process or repeatedly delay or skip its execution. In some cases, the user may repeatedly delay or skip execution of the digital display protective compensation process enough times to inadvertently allow damage to the display screen to occur, even though such damage is meant to be avoided through the scaler hardware controller 121 executing machine readable code instructions of the display device protective compensation process system 127.

A firmware level digital display device protective compensation process activity determination system 126 of embodiments of the present disclosure operates as digital display firmware 125 of an OLED digital display device 120 and may work alone or in tandem, in various embodiments, with an operating system (OS) level digital display device protective compensation process activity determination system 111 executing at an information handling system 100 operatively coupled to the OLED digital display device 120 to address these issues. A hardware processor 102 executing machine readable code instructions of the OS level digital display device protective compensation process activity determination system 111 may predict future occurrence of user inactivity based on predicted future use of input/output (IO) devices 190, such as a keyboard, mouse, trackpad, or touchpad of an information handling system 100.

A scaler hardware controller 121 on-board an OLED digital display device 120 executing machine readable code instructions of the firmware level digital display device protective compensation process activity determination system 126 may sense user inactivity in real time at the OLED digital display device 170 based on how little the image being displayed on an OLED display screen panel 123 therein has changed over a recent time period. Execution of these two systems, OS-level at an operatively coupled information handling system 100 and on-board firmware at the OLED digital display device 120, may indicate that the user is not currently using software applications within the OS 113 that reflect changes on the OLED display screen panel 123, such as by editing a document, or passively using the OLED display screen panel 123 such as watching a moving video.

Execution of the digital display protective compensation process that requires placing the OLED display screen panel 123 for the OLED digital display device 120 in a standby mode and suspending regular operation of the OLED display screen panel 123 to identify degraded pixels and adjust current or voltage to compensate those pixels may be timed for performance, in some embodiments of the present disclosure, when it is predicted that the OLED digital display device 120 will be dormant. Prediction of non-user of the OLED digital display device 120 may be made through execution of machine readable code instructions via a hardware processor such as 102, for the OS level digital display device protective compensation process activity determination system 111 to predict that IO devices 190 will not be used for a predicted time period based on extrapolation of historical usage. The predicted time period of IO device inactivity may be as long or longer than the time needed for the digital display protective compensation process to be completed by execution of the display device protective compensation system 127. In further embodiments, the digital display device protective compensation process of the display device protective compensation system 127 may not be executed by the scaler hardware controller or other hardware controller 121 unless it is determined through execution of machine readable code instructions for the firmware level digital display device protective compensation process activity determination system 126 on-board the OLED digital display device 120 that the pixel values dictating the image displayed on the OLED display screen panel 123 have changed by no more than a value that is below a maximum allowable change threshold, indicating that the image is static and the user is inactive with respect to use of the OLED digital display screen panel 123 including passive uses.

Performing the OS 113 level method alone may prompt execution of the digital display device protective compensation system 127 process when IO devices 190 are inactive and predicted to be inactive, but the user is still passively watching a video stream on the OLED digital display device 120 that does not require IO device 190 interaction. Performing the firmware-level display device protective compensation process activity determination system 126 method alone on-board the OLED digital display device 120 may prompt execution of the digital display device protective compensation system 127 process on one of a plurality of OLED digital display devices, including OLED digital display device 120 being compensated. However, the plurality of OLED digital display devices may be displaying an extended desktop and execution of the display device protective compensation system 127 may interrupt a user nonetheless if one of the monitors is the OLED digital display device 120 not being actively used, but the second monitor is being actively used. Further, performing the firmware-level display device protective compensation process activity determination system 126 method alone on-board the OLED digital display device 120 may not yield the predicted period of inactivity that would be long enough to execute the display device protective compensation system 127 risking interruption of the compensation method.

By combining both of these methods of from the OS-level and on-board firmware level together, such a second monitor being used with the OLED digital display device 120 for an extended desktop may not be subject to interruption with at least the first monitor OLED digital display device 120 being placed in standby mode if any IO device 190 is detected as used by the OS-level display device protective compensation predictive timing system 111 at the information handling system. Detection of usage of any IO device 190, or even predicted usage, by the OS-level display device protective compensation predictive timing system 111 at the information handling system 100 would thus indicate that the user may be using another operatively coupled monitor in an extended desktop. Thus, on-board inactivity detected for the OLED display screen panel 123 of the OLED digital display device 120 may still not be placed in standby mode despite the lack operation or change in pixels at the OLED display screen panel 123 of the first monitor OLED digital display device 120. Similarly, the detection of activity of IO device 190 activity or change in pixels at the OLED display screen panel 123 of the first monitor OLED digital display device 120 by the firmware-level display device protective compensation process activity determination may indicate passive use of the OLED digital display device 120 despite detecting a lack of usage of any IO device 190, or even predicted usage, by the OS-level display device protective compensation predictive timing system 111 at the information handling system 100. In this way, automatic execution of the display device protective compensation system 127 for the OLED digital display device 120 may be scheduled while minimizing interruption of the user according to embodiments herein.

In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 141, a base station transceiver 142, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term “system” shall also be taken to include any collection of systems or sub-systems that individually or jointly execute a set, or plural sets, of computer readable code instructions to perform one or more computer functions, via one or more hardware processing resources.

The information handling system 100 may include main memory 103, (volatile (e.g., random-access memory, etc.), or static memory 105, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, other hardware controllers, or any combination thereof. Additional components of the information handling system 100 may include one or more storage devices such as static memory 105 or drive unit 115. The information handling system 100 may include or interface with one or more communications ports for communicating with external devices, as well as one or more input/output (IO) devices 190, a video/graphics OLED digital display device 120, or any combination thereof. OLED digital display devices 120 may include external, standalone digital display device operatively coupled to the information handling system 100 in embodiments herein. Portions of an information handling system 100 may themselves be considered information handling systems 100.

Information handling system 100 may include devices or modules that embody one or more of the hardware devices or hardware processing resources executing machine readable code instructions for one or more systems and modules. The information handling system 100 may execute machine readable code instructions (e.g., software or firmware algorithms), parameters, and profiles 114 that may operate on servers or systems, remote data centers, or on-box in individual client information handling systems according to various embodiments herein. In some embodiments, it is understood any or all portions of machine readable code instructions (e.g., software or firmware algorithms), parameters, and profiles 114 may operate on a plurality of information handling systems 100.

The information handling system 100 may include the hardware processor 102 such as a central processing unit (CPU) or other hardware processing resources on information handling system 100 or a hardware controller 121, such as scaler hardware controller, timing controller (TCON), or other hardware controller, on the OLED digital display device 120. Any of the hardware processing resources may operate to execute machine readable code instructions 114 that are either firmware or software code. For example, the hardware processor 102 in some embodiments may execute machine readable code instructions 114 of the OS level digital display device protective compensation process activity determination system 111 on the information handling system. The hardware controller 121 may execute machine readable digital display device firmware 125 the firmware level digital display device protective compensation process activity determination system 126 or the display device protective compensation system 127 according to embodiments herein. The OLED digital display device 120 in some embodiments may include a separate hardware controller 121, such as a scaler hardware controller, to execute machine readable code instructions of digital display device firmware 125 of the firmware level digital display device protective compensation process activity determination system 126 or the display device protective compensation system 127 in embodiments herein. In such an embodiment, the OLED digital display device 120 includes a hardware controller 121 that may comprise a scaler CPU, a TCON, or other on-board processor on the OLED digital display device 120. The hardware processor 102 in the information handling system 100 may comprise a vector CPU or multi-vector CPU or may be a graphics processing unit (GPU) 106 or other hardware processing resource.

Moreover, the information handling system 100 may include memory such as main memory 103, static memory 105, and disk drive unit 115 (volatile (e.g., random-access memory, etc.), nonvolatile memory (read-only memory, flash memory etc.) or any combination thereof or other memory with computer readable medium 112 storing machine readable code instructions (e.g., software or firmware algorithms), parameters, and profiles 114 executable by the hardware processor 102, EC 104, GPU 106, or any other hardware processing device. The information handling system 100 may also include one or more buses 117 operable to transmit communications between the various hardware components such as any combination of various I/O devices 190, as well as between hardware processors 102, an EC 104, GPU 106 or other, the operating system (OS) 113, the basic input/output system (BIOS) 110, the wireless interface adapter 130, or a radio module 132, among other components described herein. In an embodiment, the hardware processor 102, EC 104, and/or GPU 106 may execute one or more bus drivers in order to transmit this data between the information handling system 100 and the input/output devices 190 described herein. As described herein, the information handling system 100 further includes a video/graphics OLED digital display device 120. The video/graphics OLED digital display device 120 in an embodiment may function as a liquid crystal display (LCD), an organic light emitting diode (OLED), a flat panel display, or a solid-state display. In embodiments herein, an OLED digital display device 120 having an OLED display screen panel 123 is described. It is appreciated that the video/graphics OLED digital display device 120 may be wired or wireless to be one or more external video/graphics OLED digital display devices 120 that allow a user to increase the display-viewable desktop area by extending the desktop displayed for the information handling system 100 in an embodiment.

A network interface device of the information handling system 100 may be wired or wireless such as shown with wireless interface adapter 130 that can provide wireless connectivity among devices such as with Bluetooth® or to a network 140, e.g., a wide area network (WAN), a local area network (LAN), wireless local area network (WLAN), a wireless personal area network (WPAN), a wireless wide area network (WWAN), or other network. In embodiments described herein, the wireless interface device 130 with its radio 132, RF front end 134 and antenna 136 is used to communicate with the network 140, via, for example, a Bluetooth® or Bluetooth® Low Energy (BLE) protocols, or other WPAN or WLAN protocols.

In an embodiment, a WAN, WWAN, LAN, and WLAN may each include an AP 141 or base station 142 used to operatively couple the information handling system 100 to a network 140 via a wireless interface adapter 130. In a specific embodiment, the network 140 may include macro-cellular connections via one or more base stations 142 or a wireless AP 141 (e.g., Wi-Fi), or such as through licensed or unlicensed WWAN small cell base stations 142. Connectivity may be via wired or wireless connection. For example, wireless network wireless APs 141 or base stations 142 may be operatively connected to the information handling system 100. Wireless interface adapter 130 may include one or more radio frequency (RF) subsystems (e.g., radio 132) with transmitter/receiver circuitry, modem circuitry, one or more antenna RF front end circuits 134, one or more wireless controller circuits, amplifiers, antennas 136 and other circuitry of the radio 132 such as one or more antenna ports used for wireless communications via multiple radio access technologies (RATs). The radio 132 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHZ)), IEEE 802.15 WPAN standards, WiMAX, WWAN such as 3GPP or 3GPP 2, Bluetooth® standards, proprietary RF protocol, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHZ, 5 GHZ, or 6 GHz bands which may be shared communication frequency bands with WWAN protocols or Bluetooth® protocols in some embodiments. Wireless interface adapter 130 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100 or integrated with another wireless network interface capability, or any combination thereof.

In some embodiments, one or more hardware processors or hardware controllers executing software, firmware, or dedicated hardware implementations such as application specific integrated circuits, programmable logic arrays and other hardware devices may be constructed to implement one or more of some systems and methods described herein.

Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software machine readable code instructions executable by a hardware controller or a hardware processor system. Further, in an exemplary, non-limited embodiment, implementations may include distributed hardware processing, component/object distributed hardware processing, and parallel hardware processing.

Alternatively, virtual computer system processing may be constructed to implement one or more of the methods or functionalities as described herein.

The present disclosure contemplates a computer-readable medium that includes machine-readable code instructions, parameters, and profiles 114 or receives and executes instructions, parameters, and profiles 114 responsive to a propagated signal, so that a hardware device connected to a network 140 may communicate voice, video, or data over the network 140. Further, the machine readable code instructions 114 may be transmitted or received over the network 140 via the network interface device or wireless interface adapter 130. The present disclosure also contemplates machine-readable code instructions, parameters, and profiles executing on a hardware controller 121 on-board the OLED digital display device 120 and includes machine readable code instructions, parameters, and profiles of digital display device firmware 125 to execute system and methods of the present disclosure.

The information handling system 100 may include a set of instructions 114 or digital display device firmware 125 that may be executed to cause the information handling system 100 or the OLED digital display device 120 to perform any one or more of the methods or computer-based functions disclosed herein. For example, machine readable code instructions 114 may be executed by a hardware processor 102, GPU 106, EC 104 or any other hardware processing resource and may include software agents, or other aspects or components used to execute the methods and systems described herein. In another example, machine readable code instructions may be executed by a hardware controller 121 or other hardware processing resource on-board an OLED digital display device 120 for execution of digital display device firmware 125 according to parameters and instructions at the OLED digital display device 120. Various software modules or firmware modules comprising application machine readable code instructions 114 may be coordinated by an OS 113, via operation of the OLED digital display device 120, and/or via an application programming interface (API) include a unified device API described herein. An example OS 113 may include Windows®, Android®, and other OS types. Example APIs may include Win 32, Core Java API, or Android APIs.

In an embodiment, the information handling system 100 may include a disk drive unit 115. The disk drive unit 115 and may include machine-readable code instructions, parameters, and profiles 114 in which one or more sets of machine-readable code instructions, parameters, and profiles 114 such as firmware or software can be embedded to be executed by the hardware processor 102 or other hardware processing devices such as a GPU 106 or EC, or other microcontroller unit to perform the processes described herein. Similarly, main memory 103 and static memory 105 may also contain a computer-readable medium for storage of one or more sets of machine-readable code instructions, parameters, or profiles 114 described herein. The disk drive unit 115 or static memory 105 also contain space for data storage. Further, the machine-readable code instructions, parameters, and profiles 114 may embody one or more of the methods as described herein. In a particular embodiment, the machine-readable code instructions, parameters, and profiles 114 may reside completely, or at least partially, within the main memory 103, the static memory 105, and/or within the disk drive 115 during execution by the hardware processor 102, EC 104, or GPU 106 of information handling system 100.

Main memory 103 or other memory of the embodiments described herein may contain computer-readable medium (not shown), such as RAM in an example embodiment. An example of main memory 103 includes random access memory (RAM) such as static RAM (SRAM), dynamic RAM (DRAM), non-volatile RAM (NV-RAM), or the like, read only memory (ROM), another type of memory, or a combination thereof. Static memory 105 may contain computer-readable medium (not shown), such as NOR or NAND flash memory in some example embodiments. The applications and associated APIs, for example, may be stored in static memory 105 or on the disk drive unit 115 that may include access to a machine-readable code instructions, parameters, and profiles 114 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 107 (a.k.a. a power supply unit (PSU)). The PMU 107 may include a hardware controller and executable machine-readable code instructions to manage the power provided to the components of the information handling system 100 such as the hardware processor 102 and other hardware components described herein. The PMU 107 may control power to one or more components including the one or more drive units 115, the hardware processor 102 (e.g., CPU), the EC 104, the GPU 106, a video/graphic OLED digital display device 120, or other wired I/O devices 190 and other components that may require power when a power button has been actuated by a user. In an embodiment, the PMU 107 may monitor power levels and be electrically coupled to the information handling system 100 to provide this power. The PMU 107 may be coupled to the bus 117 to provide or receive data or machine-readable code instructions. The PMU 107 may regulate power from a power source such as the battery 108 or AC power adapter 109. In an embodiment, the battery 108 may be charged via the AC power adapter 109 and provide power to the components of the information handling system 100, via wired connections as applicable, or when AC power from the AC power adapter 109 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 112 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
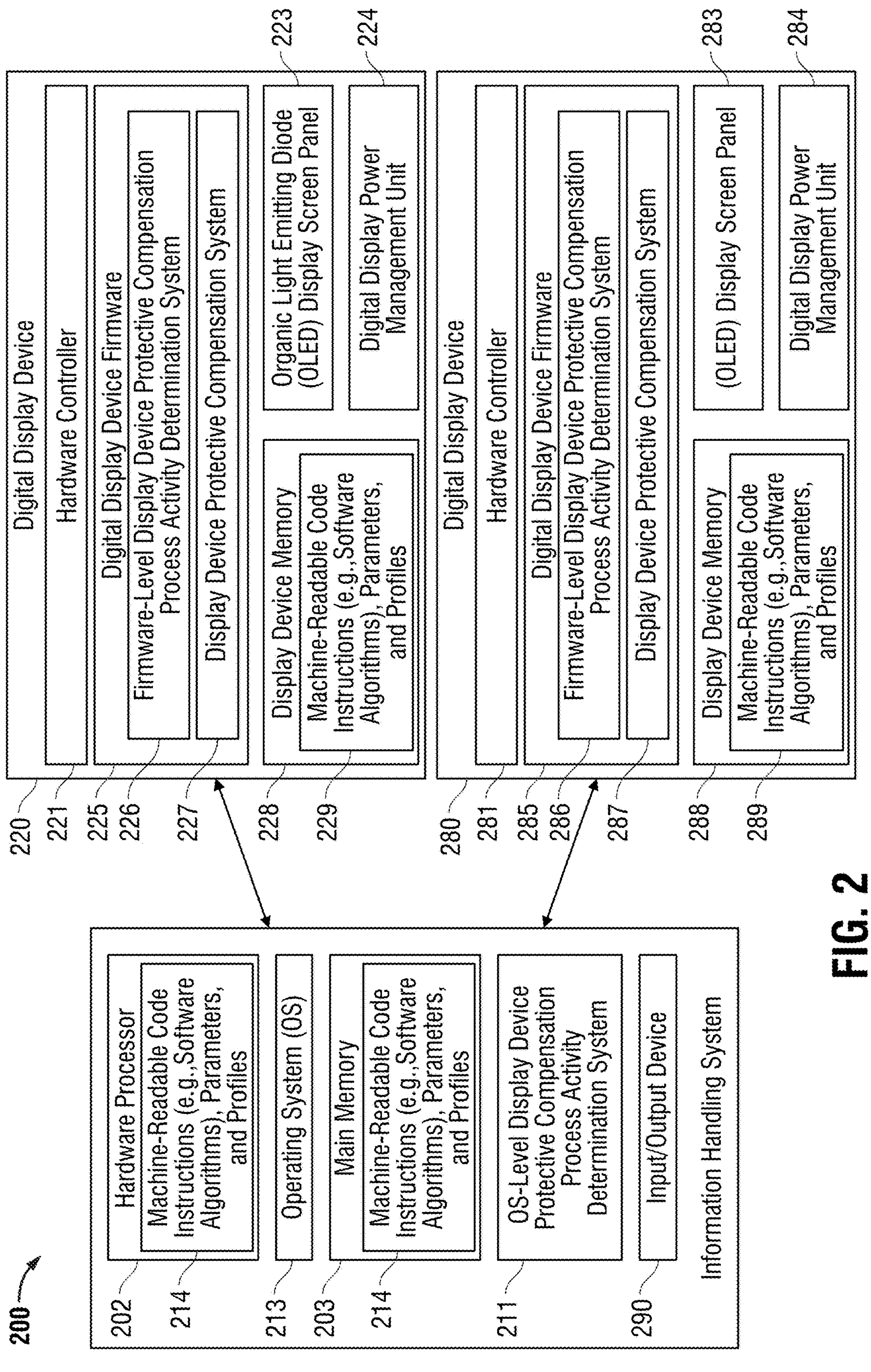
FIG. 2 is a block diagram illustrating an OLED digital display device executing at a firmware level and in tandem with an operatively coupled information handling system to execute a protective compensation process to adjust current to pixels to even out degraded pixels of the OLED digital display device and prevent or correct damage to the OLED digital display device due to prolonged use according to an embodiment of the present disclosure.

FIG. 2 is a block diagram illustrating one or more organic light-emitting diode (OLED) digital display device operatively coupled to an information handling system executing in tandem at a firmware level and an operating system (OS) level to schedule automatic executing of a protective compensation process according to an embodiment herein. A hardware controller 221 at the first OLED digital display device 220 may execute firmware 225 of a display device protective compensation system 227 to adjust current to pixels to even out degraded pixels of the OLED digital display device and prevent further or lasting damage to the OLED digital display device due to prolonged use during periods of user inactivity. Execution of display device protective compensation system 227 may be scheduled for the first OLED digital display device 220 during predicted periods of inactivity predicted based on inactivity of input/output (IO) devices according to embodiments herein. Further, execution of firmware 225 for firmware-level display device protective compensation system 226 by a hardware controller 221 on-board of the first OLED digital display device 220 to determine that the OLED display screen panel 223 is not active and displaying static images according to an embodiment of the present disclosure.

As described herein, a hardware processor 202 of an information handling system 200 executes one or more software applications of an operating system 213 to generate video data for display on the one or more OLED digital display devices 220 or 280 operatively coupled to the information handling system 200. Use of the one or more OLED digital display devices 220 or 280 may prompt execution by one or more of such OLED digital display devices 220 or 280 of a protective compensation process via execution of firmware 225 or 285 for a display device protective compensation system 227 or 287 by a hardware controller 221 or 281 respectively at the one or more OLED digital display devices 220 or 280 according to embodiments herein. This execution of the display device protective compensation system 227 or 287 operates to suspend regular operation of the OLED display screen panel 223 or 283 by placing it in a standby mode to identify degraded pixels and adjust current or voltage to compensate those pixels of the OLED digital display device 220 or 280, respectively, undergoing protective compensation to prevent further damage to the OLED digital display device 220 or 280. The execution of the display device protective compensation system 227 or 287 at the plural OLED digital display devices 220 or 280 may be executed on each individual OLED digital display device 220 or 280, but may also need coordination at the operatively coupled information handling system 200 presenting video data on these plural OLED digital display devices 220 and 280.

To avoid substantial user interruption, scheduled execution of the display device protective compensation systems 227 or 287 may be made based on predicted periods of user inactivity at the information handling system 200, as indicated by predicted periods of inactivity for all operatively coupled IO devices 290, such as a keyboard, mouse, trackpad, or touchpad for the information handling system 200. For example, a hardware processor 202 of the information handling system 200 may execute machine readable code instructions of the OS level digital display device protective compensation process activity determination system 226 at the information handling system 200 to predict a future time period in which the one or more operatively coupled IO devices 290, such as a mouse, trackpad, touchpad, or keyboard will be inactive based on historically gathered IO device activity measurements for those devices 290. This may involve inputting current or recent measurements for IO device activity for all operatively coupled devices 290 into a predictive model trained on the historical IO device activity measurements for those devices 290, to output a predicted future time window in which those IO devices 290 will not be in use. This may be an indication of future user inactivity in which a digital display protective compensation process for display device protective compensation systems 227 or 287 at the OLED digital display device 220 or 280 may be executed by respective the OLED digital display device hardware controller 221 or 281 thereon. Scheduling automatic executing machine readable code instructions of the digital display device protective compensation system 227 or 287 placing the OLED display screen panels 223 or 283 in a standby mode, respectively, without impacting user experience may occur during predicted periods of user inactivity. When such a time window of user inactivity has been predicted based on inactivity of the IO devices 290, the hardware processor 202 for the information handling system 200 may execute machine readable code instructions of the OS level digital display device protective compensation process activity determination system 211 to send an instruction to the firmware level digital display device protective compensation process activity determination system 226 or 286 that the user is expected to be inactive during that time period. This instructions may trigger execution of the digital display protective compensation process by the scaler hardware controller 221 or 281 executing machine readable code instructions of the digital display device protective compensation system 227 or 287, respectively.

More specifically, the hardware processor 202 of the information handling system 200 in an embodiment may execute machine readable code instructions 214 of an OS level digital display device protective compensation process activity determination system 211 to routinely gather input/output (IO) device 290 activity measurements, such as mouse or touchpad movement or keyboard key presses. These measurements, including timing and telemetry data for software application activity occurring on the information handling system 200, may be saved within main memory 203 to analyze, or in static memory or drive memory for later analysis of, changes in these measurements over time. For example, such IO device 290 activity measurements may include recorded keystrokes of a keyboard, position changes of a mouse or trackball, or position changes of user fingers in a trackpad as well as time of day of these executions, executing software applications at the time of those activity measurements, and other indicators of user presence or operations of the information handling system 200.

The hardware processor 202 may then execute machine readable code instructions 214 of the OS level digital display device protective compensation process activity determination system 211 to predict a future time window in which all the monitored IO devices 290 and executing software applications at the information handling system 200 as well as other sensor data, such as proximity sensor data or others, are predicted to be inactive for a threshold minimum protective compensation process time duration. The time duration of such a protective compensation process may be predicted based on firmware 225 requirements for the process as set by a manufacturer of the OLED digital display device 220 or 280 for executing the display device protective compensation system 227 or 287 on the OLED digital screen panels 223 or 283 to conduct protective compensation processes. Examples of such time durations may include eight minutes, twenty minutes, thirty minutes, or one hour in various embodiments herein. These are only a few examples of such a time protective compensation process duration, and it is contemplated that any duration of the digital display protective compensation process set by the manufacturer of the OLED digital display device may be set as the threshold minimum duration for a predicted user inactivity period in various embodiments herein that may trigger the protective compensation processes.

Such a prediction of a future time window of user inactivity may be made based on historically gathered IO device 290 activity measurements or IO device 290 usage, time of day, calendar dates, ongoing executing software applications, and sensor data (e.g., proximity sensor data, microphone sensor data, or camera sensor data) used to train an artificial intelligence (AI) predictive model. For example, the execution of the OS level digital display device protective compensation process activity determination system 211 by a hardware processor 202 may use a Poisson predictive model to analyze historical IO device 290 measurement data to identify previous time periods in which one or more IO devices 290 were active (e.g., a keystroke or a change in position at a mouse, trackpad, or trackball was recorded), and separate time periods in which such IO devices 290 were inactive (e.g., no keystroke or changes in position at a mouse, trackpad, or trackball were recorded for durations of time) based on time of day, date (e.g., day of the week) or telemetry of software or hardware activity at the information handling system 200. These binary identifiers of some IO device 290 activity and no IO device 290 activity may be fed into an AI predictive model such as a Poisson predictive model, for example, and include ongoing telemetry, sensor, and other data for the operating information handling system 200 to train the model to accurately predict future periods of time in which all IO devices 290 will likely be inactive, as well as the duration of those future periods of time to predict periods of user inactivity. Once the model has been trained in such a manner, recently received IO device 290 activity measurements and ongoing telemetry, sensor and other data for ongoing software application execution and activity at the information handling system 200 may be input into the trained AI predictive model of the OS level digital display device protective compensation process activity determination system 211 to output a predicted future window of IO device 290 inactivity, as well as a duration of such a time period, as predicted user inactivity period duration. For example, the OS level digital display device protective compensation process activity determination system 211 in an embodiment may output a predicted future window of IO device 290 inactivity predicted to occur an identified time or time of day on a particular data and the duration of such an inactivity period. In one example embodiment, OS level digital display device protective compensation process activity determination system 211 in an embodiment may output a predicted future window of IO device 290 inactivity predicted to begin in x number of minutes into the future and to last for y number of minutes.

In an embodiment in which the duration of the predicted user inactivity time period meets or exceeds the minimum threshold time period for completion of a digital display protective compensation system 227 or 287 process, the hardware processor 202 in an embodiment may execute machine readable code instructions 214 of the OS level digital display device protective compensation process activity determination system 211 to set a countdown timer to expire at the beginning of the predicted future time window of IO device 290 inactivity for executing an instruction to commence the execution of the digital display protective compensation system 227 or 287. For example, in an embodiment in which the OS level digital display device protective compensation process activity determination system 211 outputs a predicted future window of IO device 290 inactivity predicted to occur 27 minutes into the future, the timer may be set to expire in 27 minutes, just as this predicted time window of IO device 290 inactivity is predicted to begin. In one embodiment, this may comprise an instruction scheduling execution of code instructions for the digital display protective compensation system 227 or 287 by the hardware controller 221 or 281 at the OLED digital display device 220 or 280.

In an embodiment, once the countdown timer has expired, the hardware processor 202 may execute machine readable code instructions of an OS level digital display device protective compensation process activity determination system 211 to determine whether any operatively coupled IO devices 290 are currently active. If no operatively coupled IO devices 290 are determined to be currently active, this may operate to confirm predicted user inactivity to allow execution of digital display protective compensation systems 227 or 287 at the OLED digital display devices 220 or 280. If any operatively coupled IO devices 290 are determined to be currently active, this may indicate that the prediction that the user will be inactive at this predicted user inactivity period was inaccurate, requiring retraining of the AI predictive model. In such a case, the hardware processor 202 may execute machine readable code instructions 214 of the OS level digital display device protective compensation process activity determination system to input the most current IO device 290 activity measurements as well as ongoing telemetry, sensor and other data on activity at the information handling system 200 into the AI predictive model to retrain the model to more accurately predict future windows of IO device 290 inactivity moving forward.

The hardware processor 202, in an embodiment in which no operatively coupled IO devices 290 are determined to be currently active by execution of the machine readable code instructions 214 of the OS level digital display device protective compensation process activity determination system 211, may then transmit a notification of a predicted IO device inactivity window occurrence to the firmware level digital display device protective compensation process activity determination system 226 on-board the OLED digital display device 220 in some embodiments. Similarly, the hardware processor 202 of the information handling system may transmit notification of the predicted IO device in activity window to the firmware level digital display device protective compensation process activity determination system 286 on-board the second OLED digital display device 280 in some embodiments. Upon receipt of such a notification of a predicted window of user inactivity, as determined based on predicted IO device 290 inactivity and usage trends, the scaler hardware controller 221 or 281 or other hardware processing resource at the OLED digital display device 220 or 280, respectively may execute machine readable code instructions firmware 225 or 285 of the firmware level digital display device protective compensation process activity determination system 226 or 286. Execution of the firmware level digital display device protective compensation process activity determination system 226 or 286 on-board of each OLED digital display device 220 or 280 operatively coupled to an information handling system 200 further ensures user inactivity prior to execution of the display device protective compensation process via the display device protective compensation system 227 or 287 on-board each OLED digital display device 220 or 280. This may be performed in order to avoid disruption in passive use of the OLED digital display device 220 or 280, such as when the user is viewing a video stream (e.g., watching TV or a movie), but is not currently using an IO device 290. In an embodiment, a hardware processor 202 on the information handling system 200 may execute the firmware level digital display device protective compensation process activity determination system 226 or 286 for determination of OLED display screen panel 223 and 283 activity according to embodiments herein and transmit the results of that analysis to each OLED digital display device 220 or 280. Embodiments discussed herein however include execution of the firmware level digital display device protective compensation process activity determination system 226 or 286 on-board each operatively coupled OLED digital display device 220 or 280.

A scaler hardware controller 221 of the OLED digital display device 220 may execute machine readable code instructions of a firmware level digital display device protective compensation process activity determination system 226 or 286 in an embodiment to determine if there is ongoing OLED display screen panel 223 or 283 activity from passive use before performing a digital display protective compensation process at either OLED digital display device 220 or 280. The scaler hardware controller 221 may execute machine readable code instructions 229 of the firmware level digital display device protective compensation process activity determination system 226 or 286 to determine when one or more groups of pixels for the OLED display screen panel 223 or OLED display screen panel 283 are displaying a static image for a prolonged period of time, indicating user inactivity and an opportunity to place the OLED display screen panel 223 or 283 in a standby mode for execution of the digital display device protective compensation system. As an example, and as described in greater detail below with respect to FIG. 3, an image displayed on a digital display 220 in an embodiment may be static if the home desktop screen that includes a task bar and optionally one or more software application icons is displayed for an extended period. As another example, and as described in greater detail below with respect to FIGS. 4A and 4B, an image displayed on a digital display 220 in an embodiment may be static if a screen saver, such as a static image or graphic, is displayed such as when the user ceases to actively use any software applications of the OS 213 or IO devices 290 at the information handling system. In some cases, these screen savers may be framed by one or more strips of solid color, such as a black bar above and below the displayed image or graphic, or black bars to either the right or left of the displayed image or graphic.

The display of various images or graphics on OLED display screen panel 223 or 283 may be performed in accordance with pixel value data generated pursuant to received video data from the information handling system 200. Such video data is generated pursuant to execution of one or more software algorithms 214 or the OS 213 at the information handling system 200, and execution of one or more display control software or firmware algorithms 229 or 289 stored in respective display device memories 228 or 288 at each operatively coupled OLED digital display device 220 or 280. The execution of machine readable code instructions of the firmware-level display device protective compensation process activity system may sample or survey pixel data from designated sections or portions of the active OLED display screen panels 223 or 283 periodically. This sampled or surveyed pixel data is designated or associated in display device memory 228 or 288 with a timestamp of the sample and the particular grid zone from which it was taken. These grid zones are discussed further with respect to FIG. 3, FIG. 4A and FIG. 4B.

Video data generated pursuant to execution of machine readable software 214, including the OS 213 from the hardware processor 202, which may include a graphics processing unit, for example at the information handling system is received at the OLED digital display device 220 or 280 via a wired or wireless connection from the operatively coupled information handling system. Display device memory 228 or 288 may contain a computer-readable medium for storage of one or more sets of machine-readable code instructions, parameters, or profiles 229, which may embody one or more of the systems for control of OLED digital display device 220 or 280 according to methods as described herein. In a particular embodiment, the machine-readable code instructions, parameters, and profiles 229 as well as digital display device firmware 225 or 285 of some embodiments herein may reside completely, or at least partially, within the display device memory 228 or 288 for access during execution by the scaler hardware controllers 221 or 281 at the OLED digital display devices 220 and 280, respectively. For example, display device memory 228 or 288 may contain computer-readable medium in an example embodiment to store executable firmware 225 or 285 for the firmware-level display device protective compensation process activity determination system 226 or 286 as well as for the display device protective compensation systems 227 and 287 in embodiments herein. An example of display device memory 228 or 288 includes random access memory (RAM) such as static RAM (SRAM), dynamic RAM (DRAM), non-volatile RAM (NV-RAM), or the like, read only memory (ROM), another type of memory, or a combination thereof.

The pixel value data stored in display device memory 228 or 288 may include a value within a range of known values for each pixel of the OLED display screen panel 223 or of OLED display screen panel 283 directing that pixel to emit light of a given color. That pixel data value may be sampled periodically and stored for one or more pixels in each of a plurality of grid zones of the OLED display screen panel 223 or 283. For example, standard definition pixel values in an embodiment may range from zero to 255, while 4K resolution pixel values may range from zero to 2550, providing ten times the granularity between colors such as that provided by standard definition display. Each pixel may be assigned a specific value within these ranges at any given point in time and groups of pixels, such as in a grid zone, display a small portion of the image shown on the OLED display screen panel 223 or 283 of the OLED digital display devices 220 or 280. When the image changes, such as when an object in the image moves, or when the display shifts from the home desktop screen to the display of a specific software application interface or other video data, several of pixel values assigned to each pixel of the OLED display screen panel 223 or 283 may change, including with one or more sampled grid zones. Detection of this change may be made by comparison of periodic sampling and comparison of some subset of pixels within the same grid zone or an average pixel value across a grid zone periodically by execution of the firmware code instructions 225 of the firmware-level display device protective compensation process activity determination system 226 or 286 according to embodiments herein.

Some portions of a display screen for the information handling system 200 may routinely change, without user activity required. These portions, typically around a perimeter of the OLED display screen panels 223 or 283, may be subject to worse burn in, but changes therein may not indicate user activity on the corresponding OLED digital display devices 220 or 280. In other words, some changes in these perimeter portions, referred to as letterbox or pillar box portions of the OLED display screen panels 223 or 283, may be permitted while still indicating or registering as user inactivity when sampled. For example, a task bar may routinely change by adding or removing icons as various background software applications execute without user interaction, or the clock on the taskbar or in an upper corner may be changing to reflect a current time without user interaction. Thus, execution of machine readable firmware 225 or 285 for the firmware level display device protective compensation activity determination system 226 or 286 detects, in some embodiments, when pixel values for segments or grid zones of the display that do not automatically and routinely change in such a way have been recently altered. From this, the firmware level display device protective compensation activity determination system 226 or 286 determines that the respective OLED display screen panel 223 or 283 has been altered such that the user may be passively interacting with the corresponding OLED digital display device 220 or 280 or information handling system 200 in some way to cause that change. In such a case, it may be currently inappropriate to start a digital display protective compensation process to adjust current to pixels to even out degraded pixels of the OLED digital display device 220 or 280 because the user is presumably currently active and engaging, passively or actively, with the OLED digital display device 220 or 280.

Because sections of the displayed image are expected to remain static during periods of user inactivity, as described in greater detail with respect to FIGS. 3, 4A, and 4B, below, the scaler hardware controller 221 or 281 may execute machine readable code instructions of the firmware level digital display device protective compensation process activity determination system 226 or 286 to analyze average changes in pixel values across preset or previously designated groups of pixels within a grid zone or plural grid zones of the respective OLED display screen panels 223 or 283 in an embodiment. For example, the first OLED digital display device 220 may receive a notification instruction of a predicted window of user inactivity with IO device 290 having sufficient predicted duration from the operatively coupled information handling system 200. The scaler hardware controller 221 may execute machine readable code instructions 229 of the firmware level digital display device protective compensation process activity determination system 226 to determine, at scheduled pixel value measurement times, a zone wide pixel value average for each predetermined grid zone, which may be an average pixel value change across each grid zone in an embodiment. For example, for each pixel within a group of pixel in a grid zone described below with reference to FIGS. 3, 4A, and 4B, a change in pixel value may be determined by subtracting the pixel value or values for plural sampled pixels (e.g., a value between zero and 255, such as 173) assigned to that pixel at a first point in time from the pixel value (e.g., another value between zero and 255, such as 100) assigned to that pixel at a second point in time (e.g., ten minutes later), to give a single pixel value change of either 73. The pixel values for every pixel within a grid zone may be determined and averaged across all single pixel value changes to give a zone wide averaged pixel value estimate for that grid zone. This may be performed at routine intervals across a plurality of grid zones in an embodiment for later determination as to whether the zone wide average pixel value estimates for each zone have changed sufficiently to indicate that the user is currently engaged, passively or otherwise, with the OLED display screen panel 223 of the first OLED digital display device 220.

For example, the scaler hardware controller 221 may execute machine readable code instructions 229 of a firmware level digital display device protective compensation process activity determination system 226 to receive notification of a predicted IO device inactivity window occurrence from the OS level digital display device protective compensation process activity determination system 211 executing at the OS 213 level of the operatively coupled information handling system 200, as described above. More specifically, the hardware processor 202, in an embodiment in which no operatively coupled IO devices 290 are determined to be currently active, may execute machine readable code instructions 214 of the OS level digital display device protective compensation process activity determination system 211 to transmit notification of a predicted IO device and user inactivity window occurrence to the firmware level digital display device protective compensation process activity determination system 226 executing on-board the first OLED digital display device 220. Notification may also be transmitted to a second OLED digital display device 280 according to embodiments herein.

As described herein, execution of the digital display protective compensation process 227 that requires suspending the OLED display screen panel 223 for the OLED digital display 220 may be performed in some embodiments only when it is predicted through execution of machine readable code instructions 214 for the OS level digital display device protective compensation process activity determination system 211 that IO devices 290 will not be used for a predicted user inactivity time period. This predicted user inactivity time period may be as long or longer than a threshold time needed for execution of the digital display protective compensation system 227 process to adjust or correct pixel operation to be completed. In further embodiments, the digital display device protective compensation system 227 process may not be executed unless it is determined through execution of the firmware level digital display device protective compensation process activity determination system 226 on-board of the first OLED digital display device 220 that the pixel values dictating the images displayed on the OLED display screen panel 223 have changed by a value that is below a maximum allowable user activity threshold.

The maximum allowable user activity threshold for the OLED display screen panel 223 is based on a pixel value change threshold, such that if the pixel values have not changed to meet that pixel value change threshold this indicates that the image is static.

Performing only the execution of the OS level digital display device protective compensation process activity determination system 211 at the operatively coupled information handling system 200 in an embodiment may prompt automatic execution of the digital display device protective compensation system 227 process when IO devices 290 are inactive, but the user is passively watching a video stream or other passive usage of the OLED digital display device 220 that does not require IO device 290 interaction. Performing only the execution of the firmware level digital display device protective compensation process activity determination system 226 may prompt automatic execution of the digital display device protective compensation process on the first OLED digital display device 220 while the plurality of OLED digital display devices 220 and 280 are displaying an extended desktop. This may risk that the user is still actively engaged with the second OLED digital display device 280 such that automatic execution of the execution of the digital display device protective compensation system 227 process may risk interruption of the user. Thus, negative impact user experience may be at risk by using just one of the methods above.

By combining both of these control systems of the OS level digital display device protective compensation process activity determination system 211 at the information handling system 200 and the firmware level digital display device protective compensation process activity determination system 226 or 286 at the OLED digital display devices 220 or 280, interruption to the user may be avoided. Neither OLED display screen panel 223 nor 283 may be suspended if any IO device 290 is being used at the information handling system 200, or that OLED display screen panel 223 or 283 is active such as in displaying a video stream or accommodating another passive or active usage according to embodiments herein with both.

In an embodiment, the scaler hardware controller 221 may execute the firmware level digital display device protective compensation process activity determination system 226 or 286 to compare the last two determined grid zone wide pixel value averages for each grid zone against one another to determine the change in pixel values for each grid zone over a most recent time window. This change in pixel values for each grid zone over a most recent time window provides a measure of user activity resulting in changes to the OLED display screen panels 223 or 283 or a measure of user inactivity during such a most recent time window. If a determined change in pixel values for any of the grid zones meets or exceeds a threshold average pixel change value, which represents a maximum allowable user activity threshold value, this indicates user activity at the OLED display screen panel 223 or 283. User activity may include passive or active user interaction that is detected such as execution of an OS 213 level application, playback of a video stream, or movement of a cursor. The maximum allowable user activity threshold value or the average pixel value change threshold in an embodiment may be any threshold change in average pixel value at any grid zone on the OLED display screen panel 223 or 283. For example, in an embodiment in which pixels may be assigned a value between zero and 255, the maximum allowable user activity threshold value or average pixel value change threshold for a grid zone in an embodiment may be any change in average pixel value such as any value between one and ten. This maximum allowable user activity threshold value or average pixel value change threshold for any grid zone allows for some variation in the image, such as may occur with noise in the signal received from the hardware processor 202 such as a GPU, or from non-activity changes such as change in a clock or an updated passive feature such as an icon. Thus, the firmware level digital display device protective compensation process activity determination system 226 or 286 at the OLED digital display devices 220 or 280 do not interpret such noise as an indication of user interaction or activity on the OLED display screen panels 223 or 283.

In an embodiment in which such user presence of interaction is detected based on changes in average pixel values across at least one grid zone over time, execution of the protective compensation process to place the OLED display screen panel 223 or 283 in standby mode to adjust current to pixels to even out degraded pixels for the OLED digital display device 220 could cause disruption in a currently active user's experience. Thus, it may not be appropriate to perform such a protective compensation process at that time. In such a case, the scaler hardware controller 221 may execute the firmware level digital display device protective compensation process activity determination system 226 or 286 to delay execution of the display device protective compensation system 227 or 287, despite the indication received from the OS level digital display device protective compensation process activity determination system 211 that the IO devices 290 are predicted to remain inactive for a period of time. The scaler hardware controller 221 may execute the firmware level digital display device protective compensation process activity determination system 226 or 286 to continue to routinely monitor average pixel values at grid zones of the OLED display screen panels 223 or 283 to identify a time in the future in which the user is likely inactive, and the protective compensation process may be performed without impact to user experience.

In an embodiment in which the determined change in average pixel values for none of the grid zones meet the maximum allowable user activity threshold value, this may indicate that only static images are being displayed at the OLED digital display device 220 or 280 and there is an inferred lack of user inactivity. In such a case, execution of the protective compensation system 227 or 287 process to place the OLED display screen panels 223 or 283 in standby mode and adjust current to pixels to even out degraded pixels for the OLED digital display device 220 or 280, respectively, may be performed with low risk of disruption to user experience. Thus, it may be appropriate to execute such a protective compensation process at that time. The scaler hardware controller 221 or 281 in such an embodiment may then execute the digital display device protective compensation system 227 or 287.

The scaler hardware controller 221 in an embodiment may automatically execute the digital display device protective compensation system 227 or 287 to adjust current to pixels to even out degraded pixels, requiring placing the OLED display screen panel 223 or 283 in standby mode for the and initiate a protective compensation process to protect against damage from overuse, such as a pixel burn-in effect when no user activity is predicted from IO devices 290 and the OLED display screen panel 223 or 283 are inactive. In an embodiment, the OLED digital display device 220 or 280 may further include a power management unit (PMU) 224 or 284 (a.k.a. a power supply unit (PSU)). The PMU 224 or 284 may manage the power provided to the components of the OLED digital display device 220 or 280, respectively, such as the OLED display screen panel 223 or the OLED display screen panel 283, respectively. The digital display protective compensation process routinely ceases or minimizes the delivery of power to these OLED display screen panels 223 or 283 when placed in standby mode and may adjust current or voltage to those degraded pixels via the TCON or scaler hardware controller 221 or 281 for short periods of time in order to avoid or remedy the pixel burn-in effect described herein. Thus, the scaler hardware controller 221 or 281 in an embodiment may execute code instructions of the display device protective compensation system 227 or 287 to direct the PMU 224 or 283, respectively, to adjust current to pixels to even out degraded pixels and place the OLED display screen panels 223 or 283 in a standby mode for a duration of time predicted to avoid or correct such burn-in effect and during which the user is predicted to remain inactive.

The scaler hardware controller 221 or 281 in an embodiment may execute the firmware level digital display device protective compensation process activity determination system 226 or 286 to determine whether the digital display device protective compensation system 226 or 286 has had to abort the protective compensation process prior to its completion, such as if a user returns as active. As described herein, execution of the protective compensation process at the OLED digital display device 220 or 280 may involve assessing levels of brightness for pixels and adjusting current to pixels to even out degraded pixels while placing the OLED display screen panels 223 or 283 for the OLED digital display device 220 or 280, respectively, in a standby mode during automatic execution display device protective compensation system 227 or 287 processes. Previous systems required a series of notifications to the user of a need for protective compensation and user approvals or, ultimately interruption of the user's use of the OLED digital display device at some point in time to conduct the protective compensation in order to minimize or prevent damage to the OLED digital display device panel from overuse. The scaler hardware controller 221 or scaler hardware controller 281 of the OLED digital display device 220 or 280 in an embodiment automatically executes and may detect when the digital display device protective compensation system 227 or 287 process has been completed.

The scaler hardware controller 221 or 281 executing the firmware level digital display device protective compensation process activity determination system 226 or 286 or the display device protective compensation system 227 or 287 in an embodiment may report that a protective compensation process has been completed successfully back to the OS level digital display device protective compensation process activity determination system 211 at the information handling system 200. This feedback may be used to further train the OS level digital display device protective compensation process activity determination system 211 at the information handling system 200 in determination of predicted user activity time periods in embodiments herein. Notice of completion of the protective compensation process may be transmitted to the OS level digital display device protective compensation process activity determination system 211 for retraining of the predictive model at the OS 213 level. In an embodiment in which such a notification of protective compensation process completion has been received at the OS level digital display device protective compensation process activity determination system 211, this may indicate that the user remained inactive during the predicted window of user inactivity long enough for the OLED digital display device 220 or 280 to complete the protective compensation process, via the display device protective compensation system 227 or 287, respectively. In such a case, the hardware processor 202 may retrain the predictive model of the OS level digital display device protective compensation process activity determination system 211 that accurately predicted the window of user inactivity based on the accuracy of this determination.

If the scaler hardware controller 221 or 281 executes the firmware level digital display device protective compensation process activity determination system 226 or 286 or the display device protective compensation system 227 or 287, respectively, to determine that the digital display device protective compensation system 227 or 287 has not completed the display device protective compensation process, a notice of non-completion of the protective compensation process may be transmitted to the OS level digital display device protective compensation process activity determination system 211. This notice of non-completion of the protective compensation process may be transmitted to the OS level digital display device protective compensation process activity determination system 211 for retraining of the predictive model at the OS 213 level at the information handling system 200. If a notification on non-completion is received, this may indicate that the protective compensation process has was not completed. In some embodiments, no received notice of completion may indicate that the protective compensation process was not completed. In such a case, the hardware processor 202 may execute machine readable code instructions 214 of the OS level digital display device protective compensation process activity determination system 211 to continue to monitor for IO device 290 activity that may indicate user activity during execution of the protective compensation process, and thus, a need to abort the protective compensation process prior to its completion. This may also be used by the hardware processor 202 to retrain the predictive model of the OS level digital display device protective compensation process activity determination system 211 that inaccurately predicted the window of user inactivity based on the inaccuracy of this determination.

If the hardware processor 202 executing machine readable code instructions 214 of the OS level digital display device protective compensation process activity determination system 211 identifies activity for IO device 290 prior to receiving a notification from the firmware level digital display device protective compensation process activity determination system 226 or 286 of successful completion of the display device protective compensation system 227 or 287 process at the OLED digital display devices 220 or 280, the hardware processor 202 may execute machine readable code instructions 214 of the OS level digital display device protective compensation process activity determination system 211 to transmit an instruction to the firmware level digital display device protective compensation process activity determination system 226 or 286 to abort the currently executing display device protective compensation system. The hardware processor 202, or scaler hardware controller 221 or 281 in such an embodiment may then execute machine readable code instructions of the firmware level digital display device protective compensation process activity determination system 226 or 286 to abort or cease all processes of the digital display device protective compensation system 227 or 287, respectively. In addition, the hardware processor 202 may execute code instructions of the OS level digital display device protective compensation process activity determination system 211 to retrain the predictive model based on the inaccurate prediction made previously that the user will remain inactive for a period of time of sufficient duration to complete the display device protective compensation system.

In such a way, the information handling system 200 executing machine readable code instructions 214 of the OS level digital display device protective compensation process activity determination system 211 working in tandem with an OLED digital display device 220 or 280 executing at code instructions of the firmware level digital display device protective compensation process activity determination system 226 or 286 may direct automatic execution of a protective compensation system 227 or 287 process. This automatic execution of protective compensation system 227 or 287 process at the plural OLED digital display devices 220 and 280 automatically adjust current to pixels to even out degraded pixels, place OLED display screen panel 223 or 283 of the OLED digital display device 220 or 280 in a standby mode, and prevent damage to the OLED digital display device 220 or 280 due to prolonged use only during periods of user inactivity while avoiding interrupting the user. This process may be repeated routinely while any of the OLED digital display devices 220 or 280 are still powered on.

Figure 3:
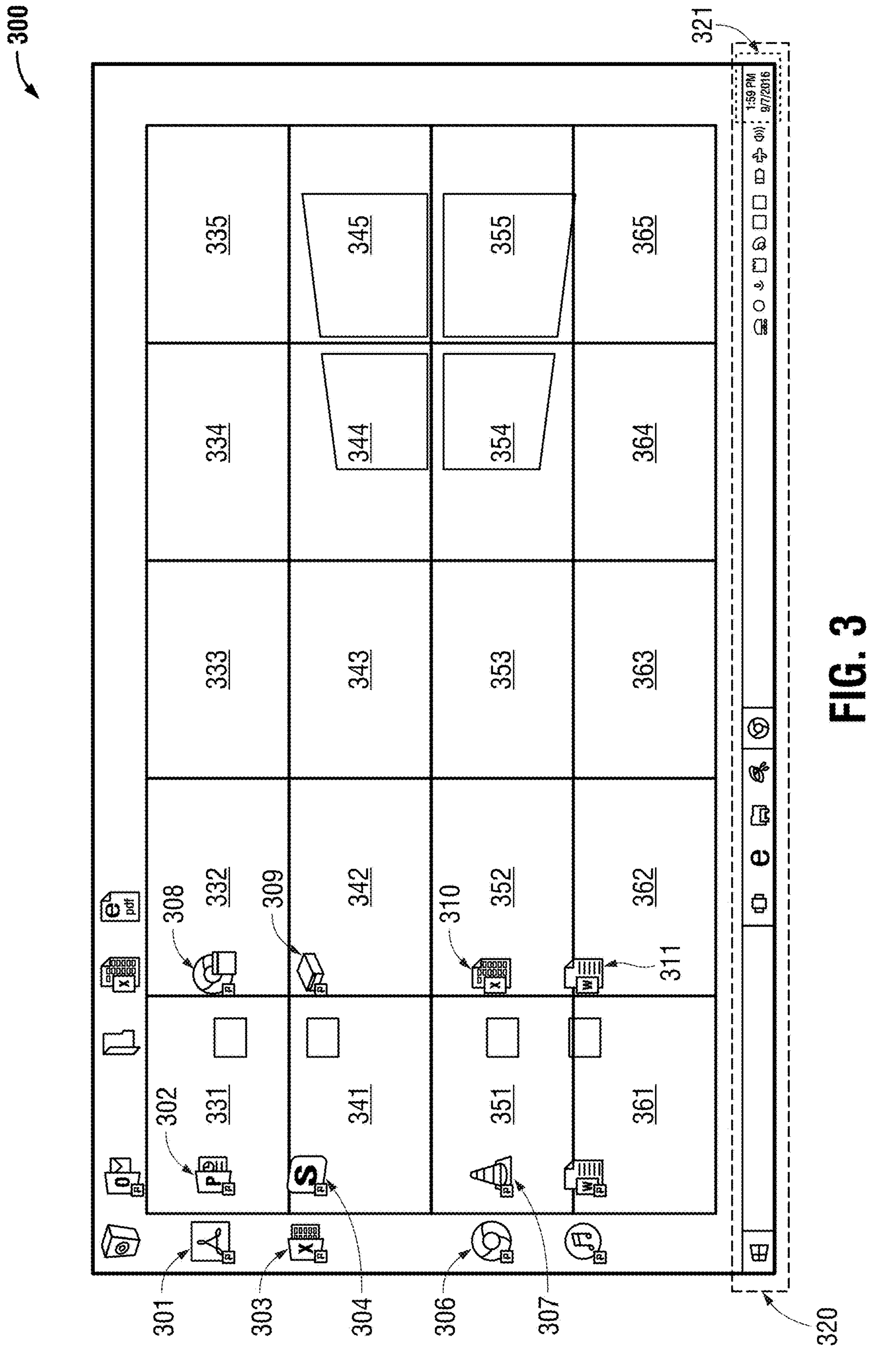
FIG. 3 is a graphical diagram illustrating an OLED digital display device screen for displaying a static image of an OS home screen and predetermined pixel grid zones according to an embodiment of the present disclosure.

FIG. 3 is a graphical diagram illustrating an organic light-emitting diode (OLED) digital display device screen for displaying a static image of an OS home screen via a plurality of pixels, where subsets of pixels are grouped into a plurality of predetermined pixel grid zones for evaluating image changes indicating current use of the OLED digital display device according to an embodiment of the present disclosure. As described herein, a scaler hardware controller may execute machine readable code instructions of a firmware level digital display device protective compensation process activity determination system in an embodiment to perform a digital display protective compensation process to place the OLED display screen panel 300 in a standby mode or full black screen and adjust current to pixels and to even out degraded pixels of the OLED display screen panel 300 in background operation. Display screen panel 300 may incur damage due to prolonged use or long duration display of static display images causing pixel degradation. In an example embodiment, an image displayed on an OLED display screen panel 300 in one example embodiment may be a home desktop screen that includes a task bar 320 and a clock 321 as well as optionally one or more software application icons, such as 301, 302, 303, 304, 305, 306, 307, 308, 309, 310, or 311. Such a home desktop screen may be a static screen in an example embodiment in that it may be displayed for an extended period without user interaction.

The scaler hardware controller may execute machine readable code instructions of the firmware level digital display device protective compensation process activity determination system to determine when one or more groups of pixels in a designated area or portion of the OLED display screen panel 300, such as pixels located within the example pixel grid zones 331, 332, 333, 334, 335, 341, 342, 343, 344, 345, 351, 352, 353, 354, 355, 361, 362, 363, 364, or 365 for the OLED display screen panel 300, are displaying a static image for a prolonged period of time. OLED display screen panel 300 is depicted in an array of 5×4 pixel grid zones, but any number of grid zones are contemplated and grid zones may be of any size of pixels groups in a contiguous physical area of the OLED display screen panel 300 in various embodiments.

Further, in some embodiments the plurality of grid zones may cover all of the OLED display screen panel 300 including task bar 320 and clock/date indicator 321 in some embodiments, or may exclude passive portions of the OLED display screen panel 300 such as a task bar 320 or clock/date indicator 321 which may change regularly but not involve user activity in other embodiments. Periodic samples of pixel values or average pixel values may be taken across each pixel grid zone 331, 332, 333, 334, 335, 341, 342, 343, 344, 345, 351, 352, 353, 354, 355, 361, 362, 363, 364, or 365. Periodic sampling of averaged pixel values may occur for a grid zone in a pixel value sampling period. For example, sampling of pixel values of each pixel grid zone 331, 332, 333, 334, 335, 341, 342, 343, 344, 345, 351, 352, 353, 354, 355, 361, 362, 363, 364, or 365 may occur every 1, 5, 10, 15, or 30 minutes although any pixel value sampling period is contemplated in embodiments herein.

When successive pixel sample values between two or more pixel value samplings have changed at or below a pixel value change threshold, or a maximum allowable user activity threshold level, pixel values within that grid zone may be considered static. Execution of code instructions of the firmware level digital display device protective compensation process activity determination system may determine static image inactivity below the maximum allowable user activity threshold level for all grid zones 331, 332, 333, 334, 335, 341, 342, 343, 344, 345, 351, 352, 353, 354, 355, 361, 362, 363, 364, and 365 which indicates user inactivity. When this user inactivity is determined, commencement of a time in which the OLED display screen panel 300 may be placed in a standby mode without impacting user experience is available.

Because sections of the OLED display screen panel 300 are expected to remain static during periods of user inactivity, the scaler hardware controller may execute machine readable code instructions of the firmware level digital display device protective compensation process activity determination system to analyze average changes in pixel values across these preset or previously designated groups of pixels within a given zone 331, 332, 333, 334, 335, 341, 342, 343, 344, 345, 351, 352, 353, 354, 355, 361, 362, 363, 364, or 365 of the OLED display screen panel 300. The scaler hardware controller may execute machine readable code instructions of the firmware level digital display device protective compensation process activity determination system to determine, at scheduled pixel value sampling measurement times, a zone wide pixel value average for each predetermined grid zone 331, 332, 333, 334, 335, 341, 342, 343, 344, 345, 351, 352, 353, 354, 355, 361, 362, 363, 364, or 365, which may be an average pixel value change across each grid zone 331, 332, 333, 334, 335, 341, 342, 343, 344, 345, 351, 352, 353, 354, 355, 361, 362, 363, 364, or 365.

For example, for each pixel within a group of pixel in a grid zone 331, 332, 333, 334, 335, 341, 342, 343, 344, 345, 351, 352, 353, 354, 355, 361, 362, 363, 364, or 365, a change in pixel value may be determined by subtracting the pixel value (e.g., a value between zero and 255, such as 173) assigned to that pixel at a first point in time from the pixel value (e.g., another value between zero and 255, such as 100 or 175) assigned to that pixel at a second point in time (e.g., ten minutes later), to give a single pixel value change of either 73 or two. This may be performed for every pixel within each grid zone 331, 332, 333, 334, 335, 341, 342, 343, 344, 345, 351, 352, 353, 354, 355, 361, 362, 363, 364, and 365, and an average may then be taken across all single pixel value changes to give a zone wide pixel value average for each zone 331, 332, 333, 334, 335, 341, 342, 343, 344, 345, 351, 352, 353, 354, 355, 361, 362, 363, 364, or 365. This may be performed at routine sampling intervals in an embodiment for later determination as to whether the zone wide pixel value averages for each of zones 331, 332, 333,

334, 335, 341, 342, 343, 344, 345, 351, 352, 353, 354, 355, 361, 362, 363, 364, and 365 have changed sufficiently to indicate that the user is currently engaged with the OLED digital display device, even with passive engagement.

Figure 4A:
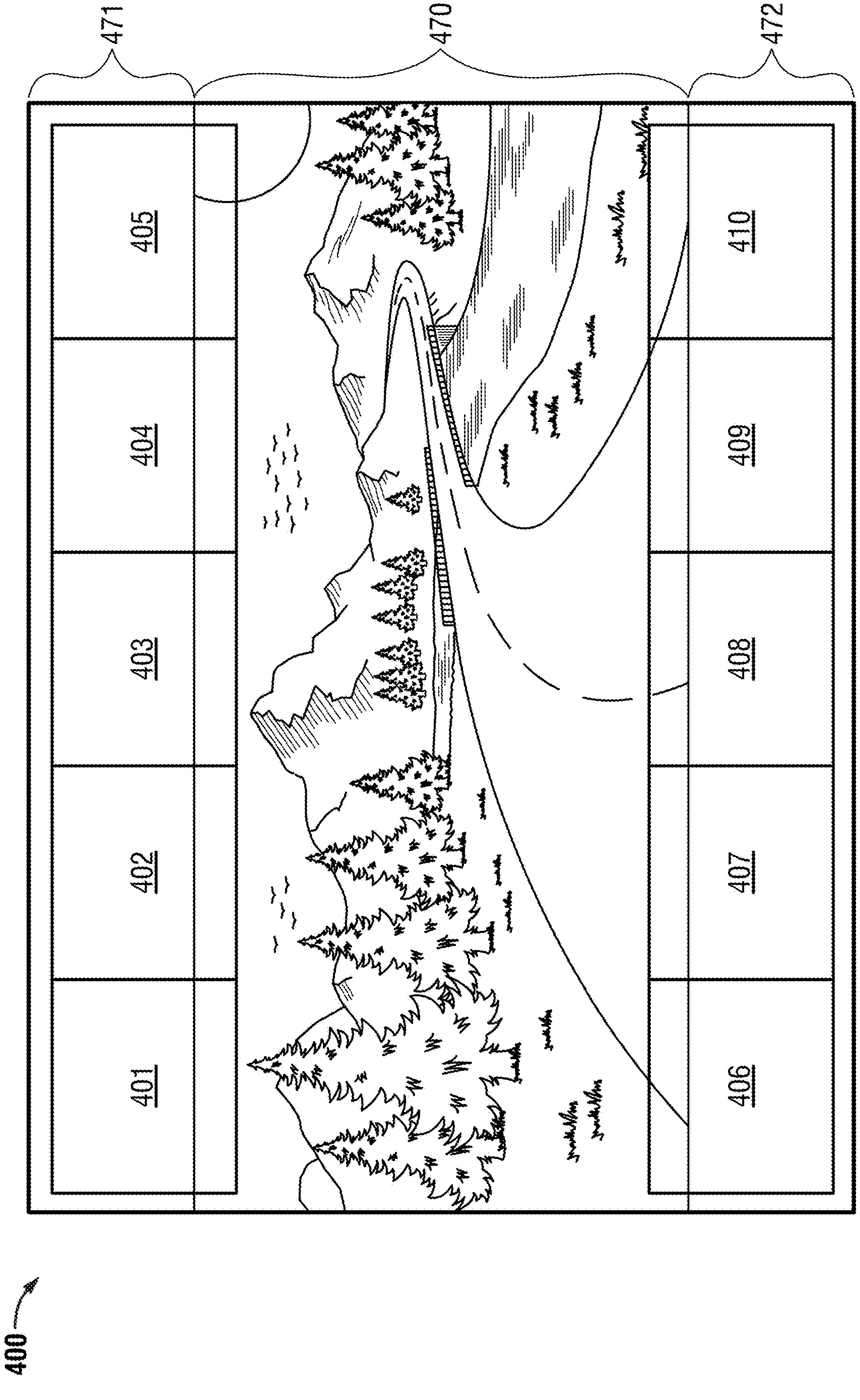
FIG. 4A is a graphical diagram illustrating an OLED digital display device screen for displaying a static or dynamic image of a screen saver in a landscape orientation outside of predetermined pixel grid zones according to an embodiment of the present disclosure.

FIG. 4A is a graphical diagram illustrating an organic light-emitting diode (OLED) display screen panel of an OLED digital display device for displaying a static or dynamic image of a screen saver in a landscape orientation according to an embodiment of the present disclosure. The OLED display screen panel 400 includes plurality of pixels that may be grouped into a plurality of predetermined pixel grid zones 401, 402, 403, 404, 405, 406, 407, 408, 409, or 410 and a central area with static image 470, such as for a screen saver, for evaluating image changes indicating current use of the OLED digital display device according to an embodiment of the present disclosure. Any number of grid zones are contemplated and grid zones may be of any size of pixels groups in a contiguous physical area of the OLED display screen panel 400 in various embodiments. As described herein, an image displayed on an OLED display screen panel 400 in an embodiment may be static if a screen saver, such as a static image 470 or other graphic is displayed in a central portion of OLED display screen panel 400 when the user ceases to actively use any software applications of the operating system (OS) or input out (IO) devices. In some cases, these screen savers static image 470 may be framed by one or more strips of solid color, such as a black bar 471 above and a black bar 472 below the image 470 or graphic displayed in a landscape orientation in a center portion of OLED display screen panel 400.

Because sections of the displayed image are expected to remain static during periods of user inactivity, the scaler hardware controller may execute machine readable code instructions of the firmware level digital display device protective compensation process activity determination system to analyze average changes in pixel values across preset or previously designated groups of pixels within the grid zones. When the information handling system or the OLED digital display device is in a sleep mode deploying the screen saver image, execution of the firmware level digital display device protective compensation process activity determination system may be limited to a smaller set of grid zones to detect any user activity such as pixel grid zones 401, 402, 403, 404, 405, 406, 407, 408, 409, or 410 of the digital OLED display screen panel 400 that requires less processing. The scaler hardware controller may execute machine readable code instructions of the firmware level digital display device protective compensation process activity determination system to determine, at scheduled pixel value measurement times, a zone wide pixel value average for each predetermined pixel grid zone 401, 402, 403, 404, 405, 406, 407, 408, 409, or 410, which may be an average pixel value change across each pixel grid zone. This may be performed for every pixel within the pixel grid zone 401, 402, 403, 404, 405, 406, 407, 408, 409, or 410, and an average may then be taken across all single pixel value changes to give a zone wide pixel value average for each pixel grid zone 401, 402, 403, 404, 405, 406, 407, 408, 409, or 410. This may be performed at routine sampling measurement intervals in an embodiment for later determination as to whether the zone wide pixel value average for any of the pixel grid zones 401, 402, 403, 404, 405, 406, 407, 408, 409, or 410 have changed sufficiently to indicate that the user is now engaged with some portion of the OLED digital display device. When no grid zones 401, 402, 403, 404, 405, 406, 407, 408, 409, or 410 exceed the maximum allowable user activity threshold or change in average pixel value threshold, the scaler hardware controller may execute machine readable code instructions of the firmware level digital display device protective compensation process activity determination system to instruct execution of the display device protective compensation system to adjust the pixels or fix any degraded pixels in the OLED display screen panel 400.

Figure 4B:
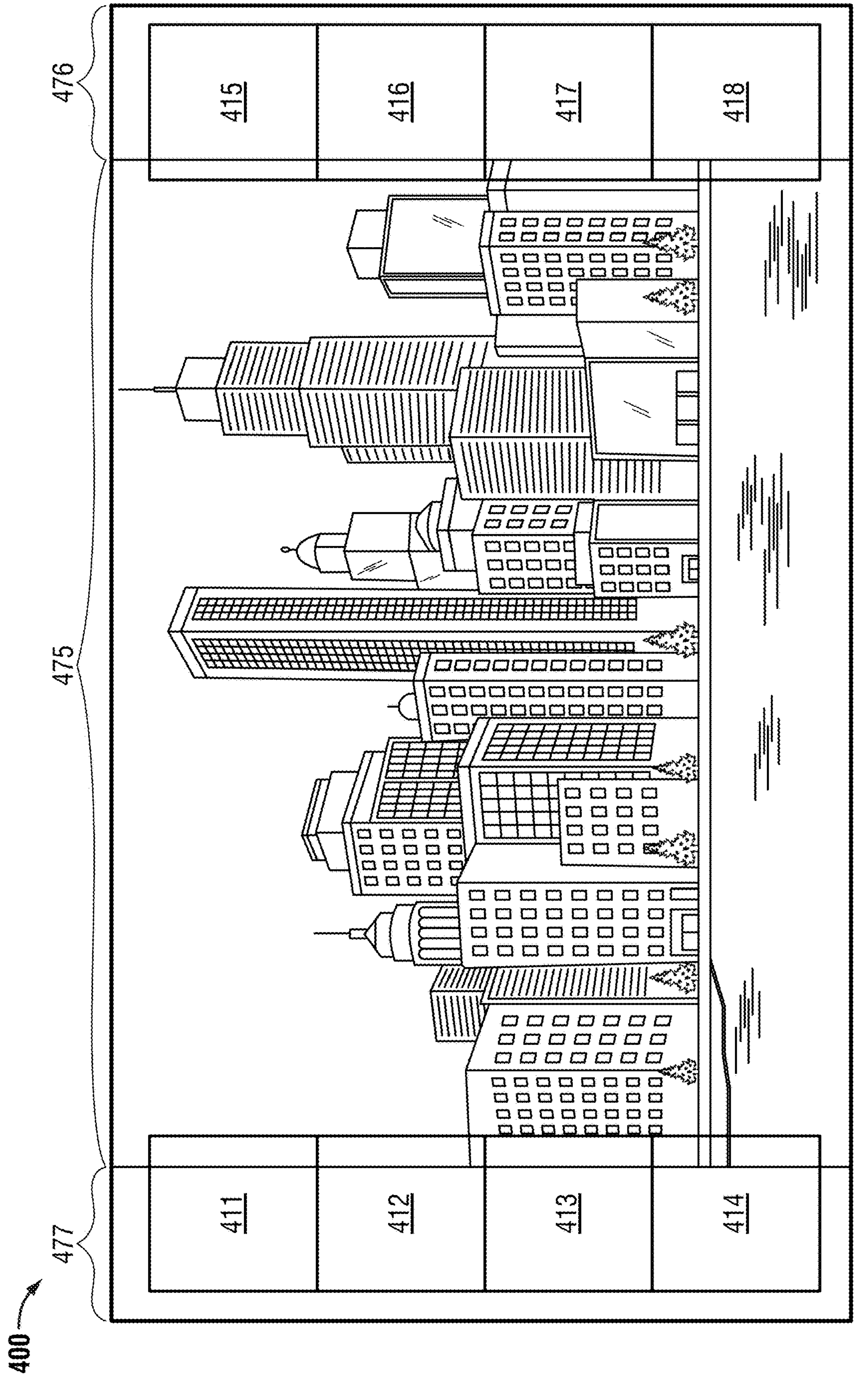
FIG. 4B is a graphical diagram illustrating an OLED digital display device screen for displaying a static or dynamic image of a screen saver in a portrait orientation outside of predetermined pixel grid zones according to an embodiment of the present disclosure.

FIG. 4B is a graphical diagram illustrating an organic light-emitting diode (OLED) display screen panel for displaying a static or dynamic image of a screen saver in a landscape orientation via a plurality of pixels grouped into a plurality of predetermined pixel grid zones according to an embodiment of the present disclosure. The plurality of pixels are grouped into pixel grid zones 411, 412, 413, 414, 415, 416, 417, or 418 and a centrally located screen saver image 475 for evaluating image changes indicating current use of the OLED digital display device according to an embodiment of the present disclosure. Any number of grid zones are contemplated and grid zones may be of any size of pixels groups in a contiguous physical area of the OLED display screen panel 400 in various embodiments. As described herein, an image displayed on OLED display screen panel 400 in an embodiment may be static if a screen saver, such as a static image 475 or graphic is displayed when the user ceases to actively use any software applications of the operating system (OS) or input out (IO) devices and the OLED digital display device and operatively coupled information handling system enter a sleep mode. In some cases, these screen savers static image 475 may be framed by one or more strips of solid color, such as a black bar 476 to the right and a black bar 476 to the left of the image 475 or graphic displayed in a portrait orientation.

Because sections of the displayed image are expected to remain static during periods of user inactivity, the scaler hardware controller may execute machine readable code instructions of the firmware level digital display device protective compensation process activity determination system to analyze average changes in pixel values across preset or previously designated groups of pixels within a pixel grid zone 411, 412, 413, 414, 415, 416, 417, or 418 of the digital OLED display screen panel 400. When the information handling system or the OLED digital display device is in a sleep mode deploying the screen saver image, execution of the firmware level digital display device protective compensation process activity determination system may be limited to a smaller set of grid zones to detect any user activity such as pixel grid zones 411, 412, 413, 414, 415, 416, 417, or 418 of the digital OLED display screen panel 400 that requires less processing. The scaler hardware controller may execute machine readable code instructions of the firmware level digital display device protective compensation process activity determination system to determine, at scheduled pixel value measurement times, a zone wide pixel value average for each predetermined pixel grid zone 411, 412, 413, 414, 415, 416, 417, or 418 which may be an average pixel value change across each grid zone. This may be performed for every pixel within the pixel grid zone 411, 412, 413, 414, 415, 416, 417, or 418, and an average may then be taken across all single pixel value changes to give a zone wide pixel value average for each of the pixel grid zones 411, 412, 413, 414, 415, 416, 417, or 418. This may be performed at routine sampling measurement intervals in an embodiment for later determination as to whether the zone wide pixel value average for any pixel grid zone 411, 412, 413, 414, 415, 416, 417, or 418 has changed sufficiently to indicate that the user is now currently engaged with the OLED digital display device. When no pixel grid zones 411, 412, 413, 414, 415, 416, 417, or 418 exceed the maximum allowable user activity threshold or change in average pixel value threshold, the scaler hardware controller may execute machine readable code instructions of the firmware level digital display device protective compensation process activity determination system to instruct execution of the display device protective compensation system to adjust the pixels or fix any degraded pixels in the OLED display screen panel 400.

Figure 5:
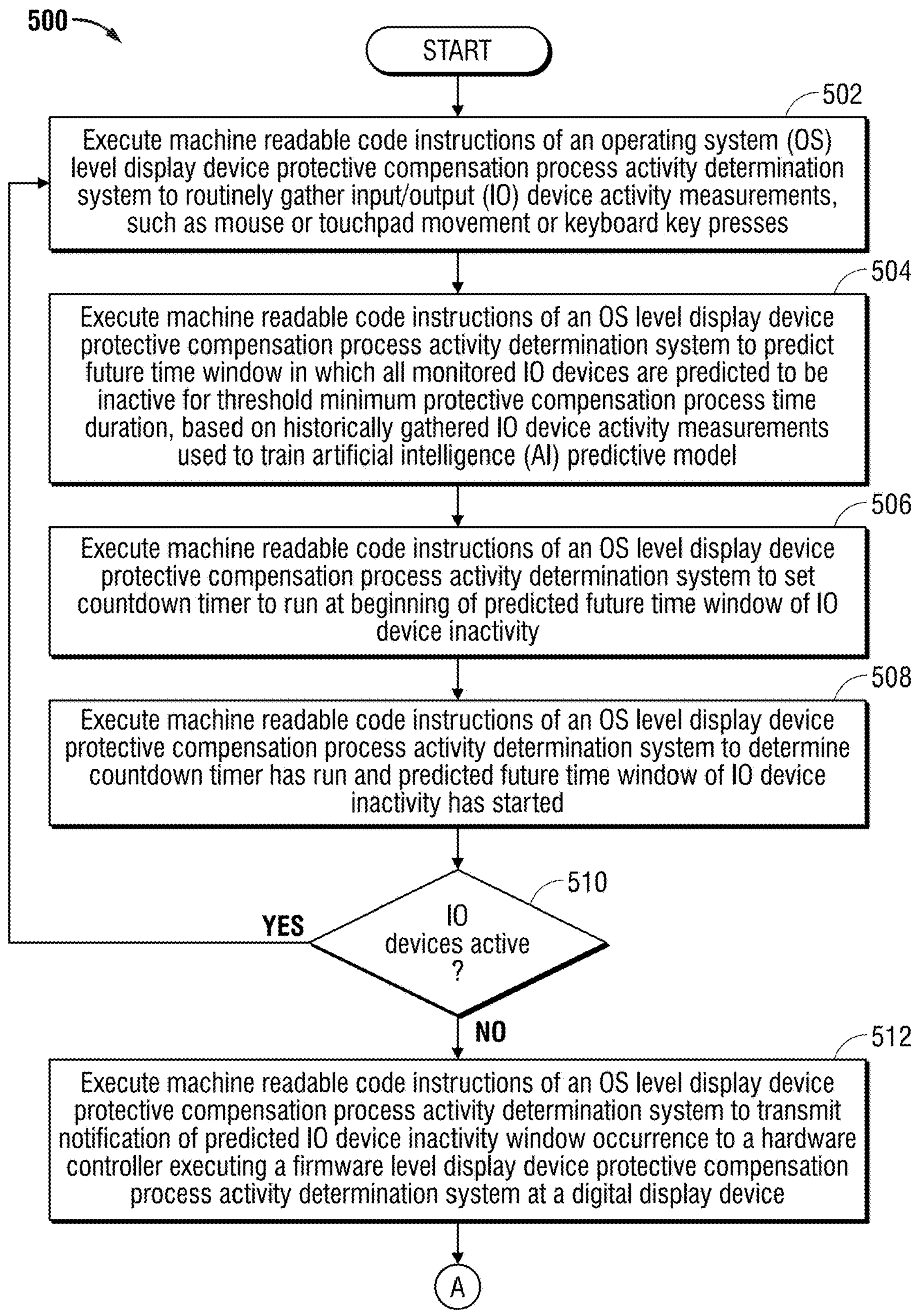
FIG. 5 is a flow diagram illustrating an information handling system operating system (OS) level method of prompting execution by an OLED digital display device of a protective compensation process during predicted periods of inactivity for all operatively coupled IO devices according to an embodiment of the present disclosure.
Figure 5:
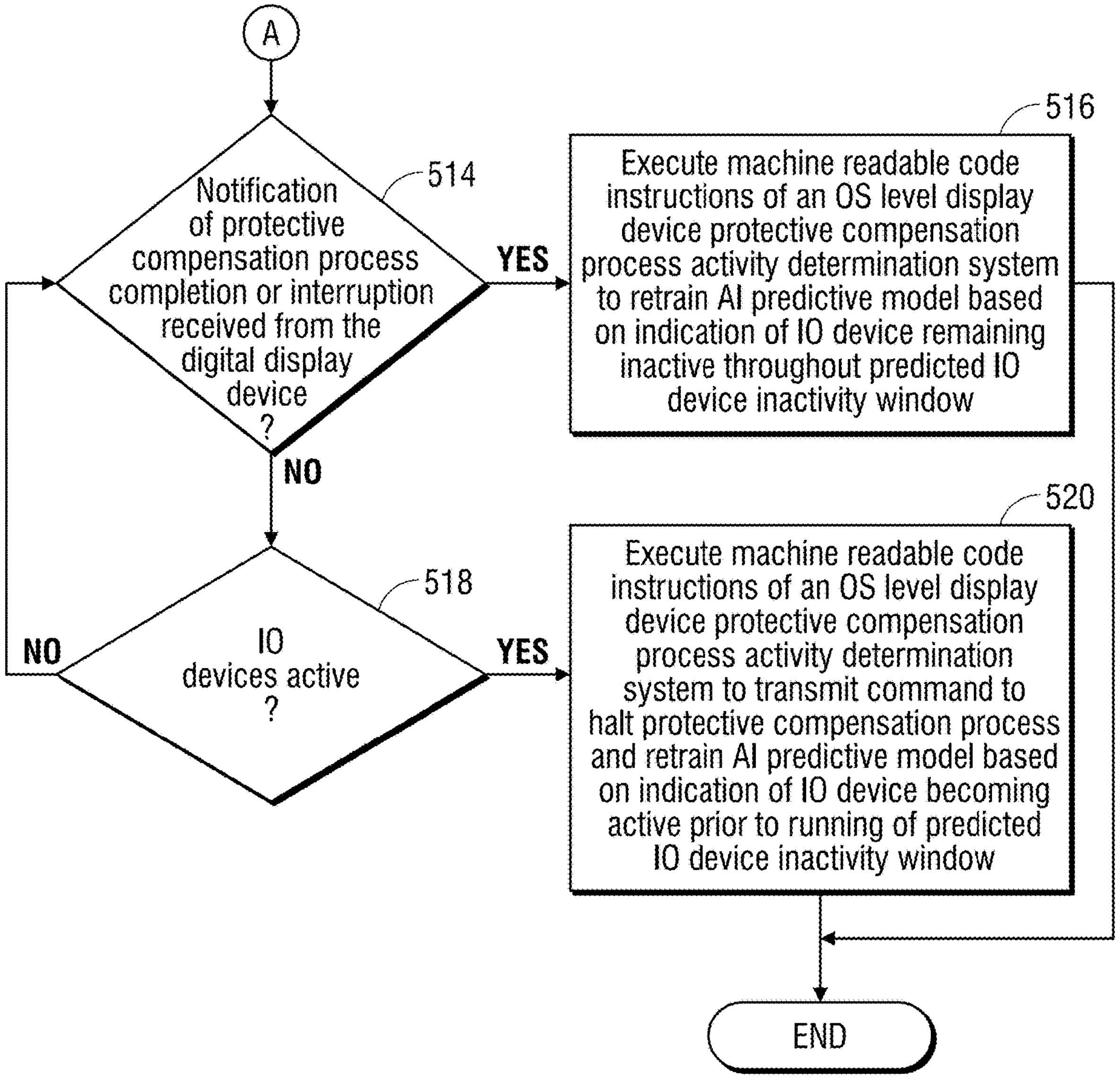

FIG. 5 is a flow diagram illustrating a method of an operating system (OS) level digital display device protective compensation process activity determination system prompting execution by an organic light-emitting diode (OLED) digital display device of a protective compensation process to adjust pixels during predicted periods of user inactivity including adjusting current or voltage to pixels to even out degraded pixels and prevent damage to the OLED digital display device according to an embodiment of the present disclosure. Prolonged use of an OLED display screen panel risk degradation of pixels within that display screen which may be mitigated by a protective compensation process with code instructions of a display device protective compensation system executed on an OLED digital display device. However, execution of the display device protective compensation system suspends the OLED display screen panel of the OLED digital display device and may interrupt the user.

According to an embodiment of the present disclosure, the display device protective compensation system is executed automatically on the OLED digital display device only when predicted periods of user inactivity, as indicated by for activity for all operatively coupled IO devices, is determined to avoid interruption of a user. No user approvals or repeated requests may be needed. In some embodiments, the execution of the OS level digital display device protective compensation process activity determination system manages user activity at an information handling system operatively coupled to one or more OLED digital display devices. As described in further embodiments herein, a firmware level digital display device protective compensation process activity determination system operating as firmware on each of the OLED digital display devices may work alone or in tandem with an OS level digital display device protective compensation process activity determination system executing at an information handling system operatively to determine when to automatically trigger a digital display device protective compensation process to address these issues of avoiding user interruption.

The hardware processor executing machine readable code instructions of the OS level digital display device protective compensation process activity determination system at the operatively coupled information handling system may predict future occurrence of user inactivity based on predicted future use of input/output (IO) devices determined from history of usage, telemetry of ongoing processes or execution of software applications at the information handling system and other possible inputs such as time of day, calendar, or other data. The digital display protective compensation process that requires placing the OLED display screen panel in a standby mode is automatically performed in some embodiments when it is predicted through execution of machine readable code instructions for the OS level digital display device protective compensation process activity determination system that IO devices will not be used again until after the digital display protective compensation process is completed.

At block 502, a hardware processor at an information handling system operatively coupled to one or more OLED digital display devices, in an embodiment, may execute machine readable code instructions of an OS level digital display device protective compensation process activity determination system to routinely gather input/output (IO) device activity measurements. For example, IO device activity measurements may include as mouse or touchpad movement or keyboard key presses from recorded keystrokes of a keyboard, position changes of a mouse or trackball, or position changes of user fingers in a trackpad. These activity measurements may take the form of input received from one or more of a plurality of IO devices operatively connected to the information handling system in an embodiment.

In an embodiment at block 504, a hardware processor of an information handling system may execute machine readable code instructions of an OS level digital display device protective compensation process activity determination system to predict future time window in which all monitored IO devices are predicted to be inactive for a threshold minimum protective compensation process time duration. Such a prediction may be based on historically gathered IO device activity measurements used to an train artificial intelligence (AI) predictive model. Additional inputs into the AI predictive model may include time of day, time counter inputs, calendar inputs such as day of week, telemetry of ongoing process of the information handling system including ongoing execution of software applications, firmware processes, or the like. Further inputs or parameters to the AI predictive model may include aspects of the OLED digital display device or the protective compensation process to be executed there including determination of durations required to complete such a protective compensation process. Example AI predictive models trained and then used to predict a future time window of user inactivity of monitored IO devices for a threshold minimum protective compensation process time duration include use of neural network algorithms, recursive neural networks algorithms, or a Poisson predictive model. Other example AI models may include execution of machine readable code instructions for decision trees, isolation forest, logic regression, state machine, time-series sliding windows, or other light-weight AI model algorithms that may balance between accuracy and system power or processing resource consumption. For example, in an embodiment described with reference to FIG. 2, the hardware processor 202 may execute machine readable code instructions 214 of the OS level digital display device protective compensation process activity determination system 211 to predict a future time window in which all the monitored IO devices 290 are predicted to be inactive for a threshold minimum protective compensation process time duration.

Such a prediction of a future time window of user inactivity may be made based on historically gathered IO device 290 activity measurements used to train the AI predictive model. For example, the OS level digital display device protective compensation process activity determination system 211 may use a Poisson predictive model to analyze historical IO device 290 measurement data to identify previous time periods in which one or more IO devices 290 were active (e.g., a keystroke or a change in position at a mouse, trackpad, or trackball was recorded), and separate time periods in which no such IO devices 290 were active (e.g., no keystroke or changes in position at a mouse, trackpad, or trackball were recorded). These binary identifiers of some IO device 290 activity and no IO device 290 activity may be fed into the AI predictive model, such as a Poisson predictive model for example, to train the AI predictive model to accurately predict future periods of time in which all IO devices 290 will likely be inactive, as well as the duration of those future periods of time. Additional inputs may include time, calendar, telemetry of ongoing processes or software execution as well as duration of protective compensation processes for operatively coupled OLED digital display devices 220 or 280.

Once the AI predictive model has been trained in such a manner, recently received IO device 290 activity measurements may be input into the trained AI predictive model of the OS level digital display device protective compensation process activity determination system 211 to output a predicted future window of IO device 290 inactivity, as well as a duration of such a time period. In an embodiment, the OS level digital display device protective compensation process activity determination system 211 in an embodiment may output a predicted future window of IO device 290 inactivity predicted to occur x minutes into the future and to last for y minutes. For discussion purposes x may be 27 minutes and y may be 19 minutes.

At block 506, a hardware processor in an embodiment may execute machine readable code instructions of an OS level digital display device protective compensation process activity determination system to set countdown timer to run until the beginning of predicted future time window of IO device inactivity. For example, in an embodiment in which the OS level digital display device protective compensation process activity determination system outputs a predicted future window of IO device inactivity predicted to occur 27 minutes into the future, the timer may be set to expire in 27 minutes, just as this predicted time window of IO device inactivity is predicted to begin.

A hardware processor in an embodiment at block 508 may execute machine readable code instructions of an OS level digital display device protective compensation process activity determination system to determine countdown timer has run and that the predicted future time window of IO device inactivity has arrived. Once the countdown timer has expired, the hardware processor at the information handling system may execute machine readable code instructions of the OS level digital display device protective compensation process activity determination system to determine whether any operatively coupled IO devices are currently active to confirm inactivity.

At block 510 in an embodiment, a hardware processor may execute machine readable code instructions of an OS level digital display device protective compensation process activity determination system to determine whether any operatively coupled IO devices are currently active to confirm inactivity. If no operatively coupled IO devices are determined to be currently active, this may indicate that the prediction that the user will be inactive was accurate as determined at block 504, and the method may proceed to block 512 for prompting execution of the digital display device protective compensation process at the one or more OLED digital display devices to place the OLED display screen panels in a standby mode. Then the protective compensation process may be commenced to adjust current to pixels to even out degraded pixels for the OLED digital display device during at least a portion of the predicted period of user inactivity. If any operatively coupled IO devices are determined to be currently active at block 510, this may indicate that the prediction that the user will be inactive, as determined at block 504, was inaccurate. When an IO device is active at block 510, the method may proceed back to block 502 for routine gathering of IO device activity measurements without initiation of execution of the digital display device protective compensation process. This information confirming inactivity or determining inaccurate prediction of user inactivity at block 510 may be fed back into training the AI predictive model. By repeating the loop between blocks 502 and 510 in such a way, the OS level digital display device protective compensation process activity determination system may notify the OLED digital display device of predicted user inactivity and may prompt execution of the digital display device protective compensation process only during confirmed periods of user inactivity of IO devices and ongoing training of the AI predictive model may be conducted to improve accuracy.

At block 512, no operatively coupled IO devices are determined to be currently active and the predicted time window of user activity arrives or its arrival is pending to allow for some lead time, the hardware processor executes machine readable code instructions of an OS level digital display device protective compensation process activity determination system to transmit notification of the predicted IO device inactivity window occurrence to firmware level digital display device protective compensation process activity determination system executing at the one or more operatively coupled OLED digital display devices. This may occur because the OS level digital display device protective compensation process activity determination system has confirmed that no IO devices are currently being used, and no further use is expected to occur for the time window predicted at block 504 above.

Upon receipt of such a notification of a predicted window of user inactivity, as determined based on predicted IO device inactivity, the scaler hardware controller may execute machine readable code instructions of the firmware level digital display device protective compensation process activity determination system at that OLED digital display device to further ensure user inactivity prior to execution of the display device protective compensation process. This may be performed in order to avoid disruption in passive use of the OLED digital display device, such as when the user is viewing a video stream (e.g., watching TV or a movie), but is not currently using an IO device. In other embodiments, the OS level digital display device protective compensation process activity determination system may operate without firmware level digital display device protective compensation process activity determination system at the OLED digital display device. In such an embodiment, notification of a predicted window of user inactivity, as determined based on predicted IO device inactivity, may be sent to the scaler hardware controller to execute machine readable code instructions of the display device predictive compensation system at the OLED digital display device for the protective compensation process. In some embodiments, a warning graphical message or notice, with a timeout, may be presented to a user on the OLED digital display device before automatic execution of the display device predictive compensation system by the scaler hardware controller. Such a graphical warning message may not require user response, but may allow for a user to decline execution of the display device predictive compensation system in some embodiments.

At block 514, a hardware processor in an embodiment may execute machine readable code instructions of an OS level digital display device protective compensation process activity determination system to determine whether notification has been received that the digital display device protective compensation process has been completed by the OLED digital display device. If such a notification has been received, this may indicate that the user remained inactive during the predicted window of user inactivity long enough for the OLED digital display device to complete the protective compensation process. In other embodiments, a notice may be received that the protective compensation process was interrupted by a user or declined. In such cases, the method may proceed to block 516 for retraining of the AI predictive model that accurately predicted the window of user inactivity based on the accuracy of this determination.

If such a notification has not been received, this may indicate that the protective compensation process has not yet been completed or a notification may be received that the protective compensation process was interrupted by the user. In such a case, the method may proceed to block 518 to continue to monitor for IO device activity that may indicate user activity during execution of the protective compensation process, and thus, a need to abort the protective compensation process prior to its completion.

A hardware processor at block 516 in an embodiment in which notification has been received that the digital display device protective compensation process has been completed by the OLED digital display device or notice that a user has actively aborted the protective compensation process at the information handling system, the hardware processor may execute machine readable code instructions of an OS level digital display device protective compensation process activity determination system to retrain AI predictive model based on indication of IO device remaining inactive throughout or being interrupted during the predicted IO device inactivity window. In an embodiment in which a notification of process completion has been received at the OS level digital display device protective compensation process activity determination system, this may indicate that the user remained inactive during the predicted window of user inactivity long enough for the OLED digital display device to complete the protective compensation process, via the display device protective compensation system. In such a case, the hardware processor may retrain the predictive model of the OS level digital display device protective compensation process activity determination system that accurately predicted the window of user inactivity based on the accuracy of this determination. In an embodiment in which a notification of process interruption has been received at the OS level digital display device protective compensation process activity determination system, this may indicate that the user did not remain inactive during the predicted window of user inactivity long enough for the OLED digital display device to complete the protective compensation process, via the display device protective compensation system. In such a case, the hardware processor may retrain the predictive model of the OS level digital display device protective compensation process activity determination system that inaccurately predicted the window of user inactivity based on indication of the inaccuracy of this determination. The method may then end.

In an embodiment at block 518 in which no notification has been received that the digital display device protective compensation process has been completed by the OLED digital display device, a hardware processor may execute machine readable code instructions of an OS level digital display device protective compensation process activity determination system to determine whether any IO devices are currently active. If such a notification has not been received, this may indicate that the protective compensation process has not yet been completed. In such a case, the hardware processor may execute machine readable code instructions of the OS level digital display device protective compensation process activity determination system to continue to monitor for IO device activity that may indicate user activity during execution of the protective compensation process, and thus, a need to abort the protective compensation process prior to its completion.

Any indication of IO device activity prior to receiving a notification of completion of the digital display device protective compensation process may indicate user activity during the predicted window of user inactivity determined from block 504. In such a case, the method may proceed to block 520 for transmission to the OLED digital display device of a command to abort the currently executing digital display device protective compensation process to allow the user to continue to use the OLED digital display device. Further, this may prompt retraining of the predictive model based on the inaccurate prediction of user inactivity made at block 504. If no indication of IO device activity is detected, the method may proceed back to block 514 to determine if notification of the digital display device protective compensation process has been received. By repeating the loop between block 514 and 518 in such a way, the hardware processor may execute machine readable code instructions of an OS level digital display device protective compensation process activity determination system to consistently monitor for IO device activity indicating user activity during a prompted execution by the OLED digital display device of the protective compensation process, in order to minimize any disruption of user experience or access to the OLED digital display device due to execution of the protective compensation process.

At block 520, in an embodiment in which IO device activity is detected prior to receipt of a notification of completion of the digital display device protective compensation process, the hardware processor may execute machine readable code instructions of the OS level digital display device protective compensation process activity determination system to transmit a command to abort or halt the protective compensation process currently being executed at the OLED digital display device. If the hardware processor executing machine readable code instructions of the OS level digital display device protective compensation process activity determination system identifies activity for IO device prior to receiving a notification from the firmware level digital display device protective compensation process activity determination system of successful completion of the display device protective compensation process, the hardware processor may execute machine readable code instructions of the OS level digital display device protective compensation process activity determination system to transmit an instruction to the firmware level digital display device protective compensation process activity determination system to abort the currently executing display device protective compensation system. The scaler hardware controller in such an embodiment may then execute machine readable code instructions of the firmware level digital display device protective compensation process activity determination system to abort or cease all processes of the digital display device protective compensation system. In addition, the hardware processor may execute code instructions of the OS level digital display device protective compensation process activity determination system to retrain the predictive model based on the inaccurate prediction made previously that the user will remain inactive for a period of time of sufficient duration to complete the display device protective compensation system. The method may then end.

Figure 6:
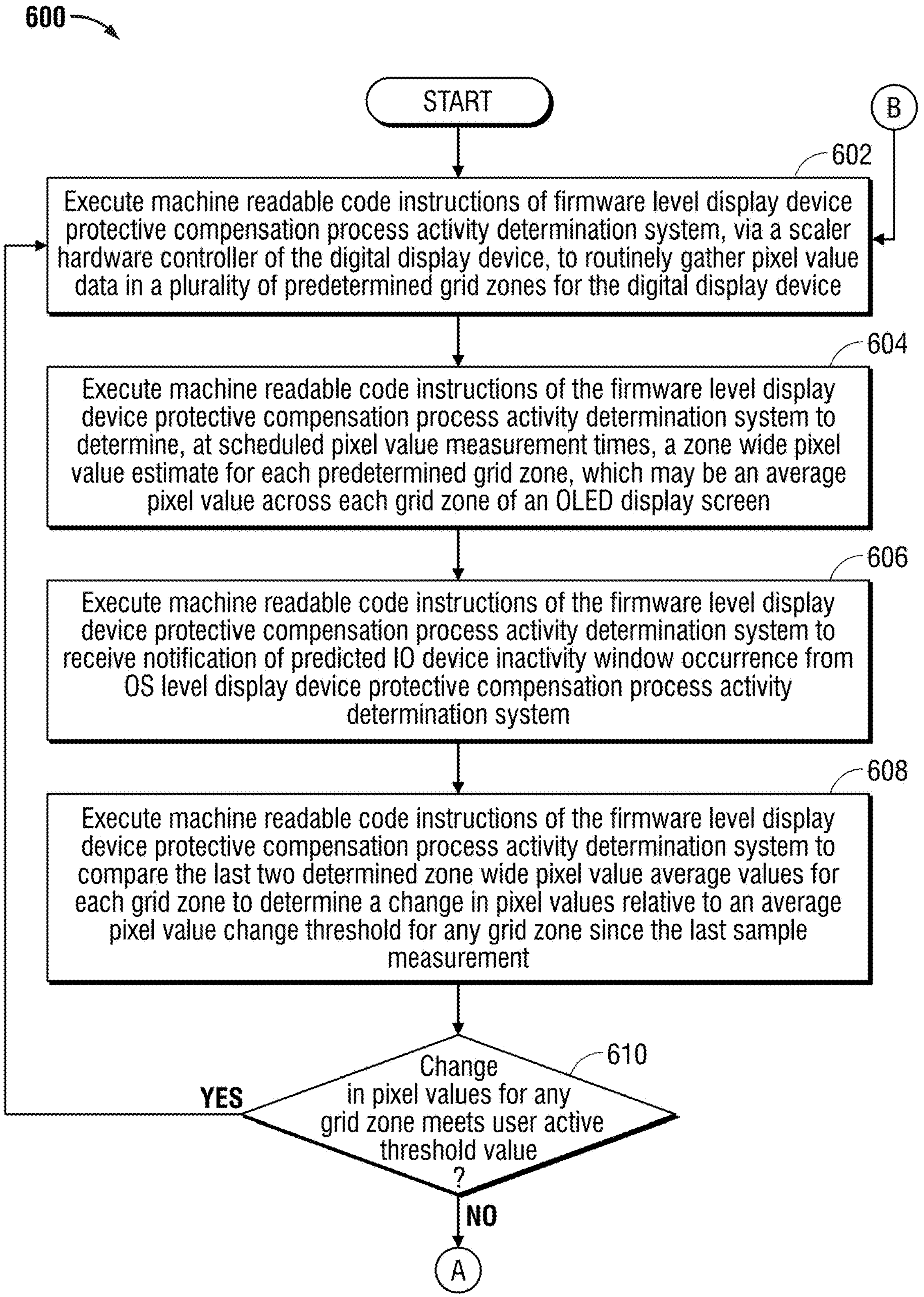
FIG. 6 is a flow diagram illustrating an OLED digital display device firmware-level method for executing a protective compensation process during predicted periods of user inactivity, as indicated by static display images according to an embodiment of the present disclosure.
Figure 6:
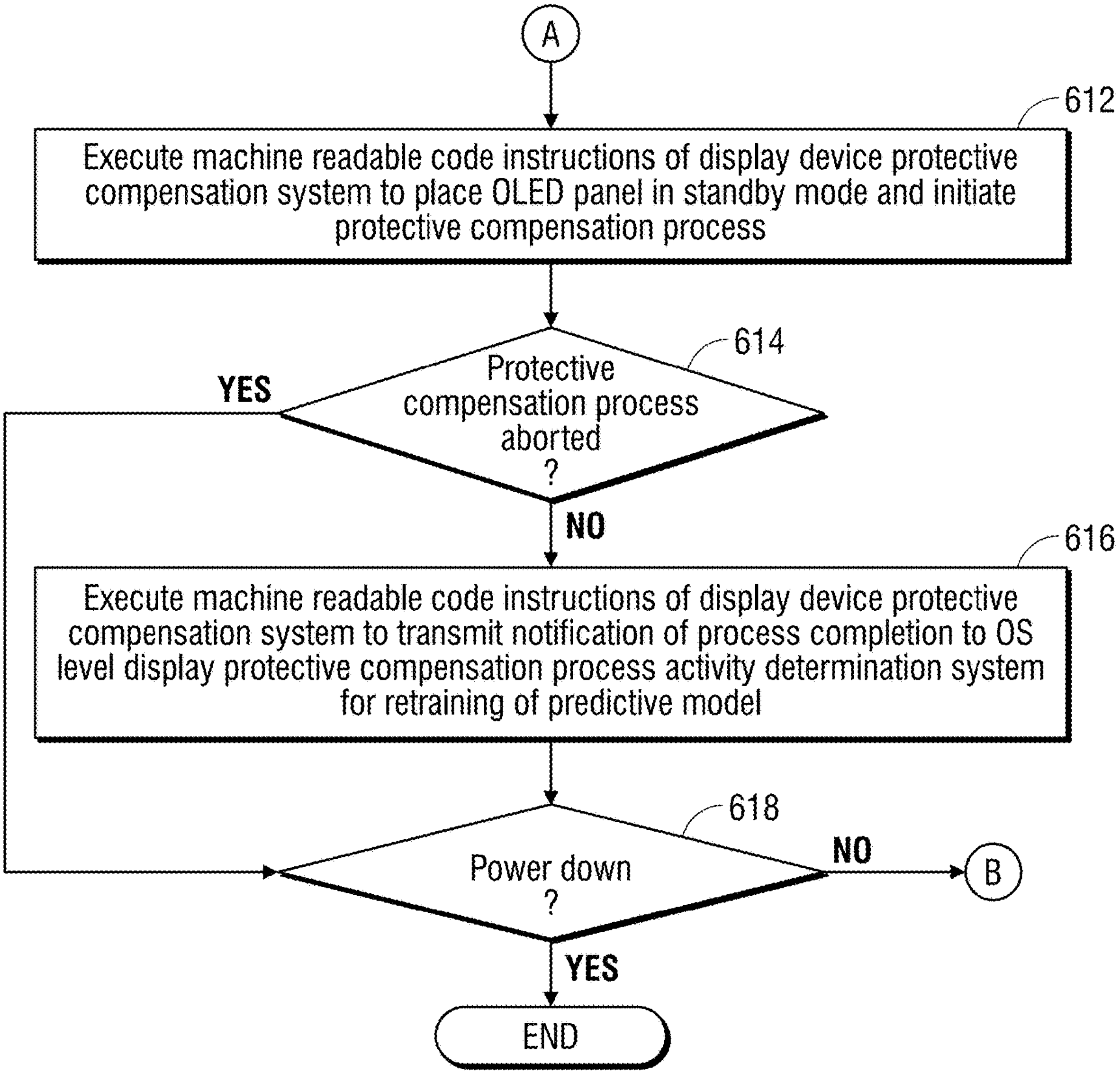

If the protective compensation process for OLED digital display device has not been completed, this may indicate a need to find a future time window in which the OLED digital display device, pursuant to the embodiment of FIGS. 5 and 6, may perform a protective compensation process to place the OLED display screen panel in a standby mode, adjust current to pixels to even out degraded pixels of the OLED digital display device and prevent damage to the OLED digital display device due to prolonged use. The process of FIG. 5 above provides for the hardware processor executing machine readable code instructions of the OS level digital display device protective compensation process activity determination system to prompt execution by the OLED digital display device of the protective compensation process only during predicted periods of user inactivity, as indicated by predicted periods of inactivity for all operatively coupled IO devices. In such a way, the information handling system executing machine readable code instructions of the OS level digital display device protective compensation process activity determination system working in tandem with an OLED digital display device executing at code instructions of the firmware level digital display device protective compensation process activity determination system may direct execution of a protective compensation process to place the OLED display screen panels in standby mode, adjust current to pixels to even out degraded pixels of the OLED digital display device, and prevent damage to the OLED digital display device due to prolonged use only during periods of user inactivity.

FIG. 6 is a flow diagram illustrating a method for a scaler hardware controller executing machine readable code instruction of a firmware level digital display device protective compensation process activity determination system to schedule execution of a protective compensation process to prevent damage to the OLED display screen panel by determination of static display of images according to an embodiment of the present disclosure. Execution of digital display device protective compensation places an organic light-emitting diode (OLED) panel in a standby mode in which the user cannot use the OLED display screen panel to adjust current to pixels to even out degraded pixels of the OLED digital display device. This is done to avoid or overcome damaged or degraded pixels due to prolonged use of the OLED digital display device and must be conducted periodically. Execution of machine readable code instructions for the firmware level digital display device protective compensation process activity determination system periodically samples pixel values of the OLED display screen panel to determine when the images displayed on the screen have changed by a value at or below pixel value change threshold that reflects a maximum allowable user activity threshold. When periodically sampled pixel values of the OLED display screen panel are below the pixel value change threshold, for example an averaged pixel value change threshold, this indicates the image is static and a user is not currently engaged with the OLED digital display device. At such a time, the scaler hardware controller may commence execution of the digital display device protective compensation at the OLED digital display device in some embodiments.

As described herein, in some embodiments, the digital display protective compensation process that requires placing the OLED display screen panel in a standby mode may be performed in some embodiments only when it is predicted through execution of machine readable code instructions for the OS level digital display device protective compensation process activity determination system that IO devices will not be used again until after the digital display protective compensation process is completed. In such embodiments the firmware level digital display device protective compensation process activity determination system at the OLED digital display device operates in tandem with the method of the OS level digital display device protective compensation process activity determination system to schedule the digital display device protective compensation. By combining operation of both the OS level digital display device protective compensation process activity determination system and the firmware level digital display device protective compensation process activity determination system together, neither of a plurality of OLED digital display devices may be placed in a standby mode if any IO device is being used at the information handling system, and any OLED digital display device displaying a video stream or otherwise being passively used may not be placed in standby mode despite the lack of IO device activity.

At block 602, a scaler hardware controller in an embodiment may execute machine readable code instructions of an firmware level digital display device protective compensation process activity determination system at an OLED digital display device operatively coupled to an information handling system to routinely gather pixel value data in a plurality of predetermined grid zones for the OLED digital display device to monitor activity at an OLED display screen panel therein. The display of images or graphics on the OLED display screen panel of the OLED digital display device may be performed in accordance with pixel value data for pixels of the OLED display screen panel based on received video data and on pixel settings driving the pixels. Those pixel settings may be stored in display device memory and used by the scaler hardware controller to apply to video data received at the OLED digital display device firmware from the hardware processor, such as a graphics processing unit, at an operatively coupled information handling system, for example. The resulting pixel value data may include a value within a range, for example, of known values for each pixel of the digital display directing that pixel to emit light of a given color as well as pixel values for intensity or brightness levels for those pixels. Each pixel may be assigned one or more specific pixel values within a range of values (e.g., zero to 255 for standard definition or zero to 2550 for 4K resolution) as well as grayscale pixel intensity values at any given point in time in order to drive a pixel among the plurality of pixels to display the image shown on the OLED display screen panel. When the image changes, such as when an object in the image moves, or when the display shifts from the home desktop screen to the display of a specific software application interface, several of these pixel values assigned to each pixel of the OLED display screen panel may change.

In an embodiment at block 604, a scaler hardware controller may execute machine readable code instructions of the firmware level digital display device protective compensation process activity determination system to sample, at scheduled pixel value measurement times, a zone wide pixel value average for each predetermined grid zone of a subset of pixels for the OLED display screen panel. This zone wide pixel value average may be an average pixel value across the subset of pixels for each pixel grid zone. Because sections of the displayed image are expected to remain static during periods of user inactivity, the scaler hardware controller may execute machine readable code instructions of the firmware level digital display device protective compensation process activity determination system to analyze changes in average pixel values across the preset or previously designated groups of pixels within the grid zones of the OLED display screen panel between pixel value sample measurements which are conducted periodically. Periodic pixel value averaging across each grid zone of the OLED display screen panel occurs at a sampling frequency that may be any sampling period from every 5 seconds to 20 or 30 minutes. In some embodiments, pixel value sampling may not be commenced until a predicted time period of inactivity for IO devices is received from an OS level digital display device protective compensation process activity determination system at the operatively coupled information handling system.

The scaler hardware controller may execute machine readable code instructions of the firmware level digital display device protective compensation process activity determination system to determine, at scheduled pixel value measurement times, a zone wide pixel value average for each predetermined pixel grid zone, which may be an average pixel values across each grid zone for comparison to a previous zone wide pixel value average from pixel value sample measurements taken at an immediately previous sampling. Pixel values, for color, grayscale, brightness or the like, may be performed for every pixel within the grid zone, and an average may then be taken across all single pixel values to give a zone wide pixel value average for each pixel grid zone. This may be performed at routine intervals in an embodiment for later determination as to whether the zone wide pixel value averages for any pixel grid zone has changed above a average pixel value threshold to indicate that a maximum allowable user activity level has been met or exceeded such that the user is currently engaged with the OLED digital display device, even if passively. Determination of the sampling and average pixel grid zone pixel values may be triggered for example, when a notification is received from the OS level digital display device protective compensation process activity determination system that the IO devices are currently inactive and the user is expected to remain inactive long enough for the display device protective compensation system to perform the protective compensation system without affecting user experience in an embodiment. In some embodiments, only the firmware level digital display device protective compensation process activity determination system is available, and pixel value sampling may occur to determine inactivity of the OLED display screen panel before the scaler hardware controller executes the display device protective compensation system. In some embodiments, this may require notice, that times out but provides an abort option, to the user of pending interruption of use of the OLED digital display device while an OLED protective compensation process occurs.

At block 606, in an embodiment, a scaler hardware controller may execute machine readable code instructions of a firmware level digital display device protective compensation process activity determination system to receive notification of a predicted IO device inactivity window occurrence from an operating system (OS) level digital display device protective compensation process activity determination system executing at the OS level of an operatively coupled information handling system. For example, as described above with respect to embodiments herein such as at FIG. 5, a hardware processor in an embodiment may execute machine readable code instructions of an OS level digital display device protective compensation process activity determination system may utilize an AI predictive model to generate a predicted time period of user inactivity including start time and a duration. Further, the OS level digital display device protective compensation process activity determination system may further determine before start of the period of user inactivity that no operatively coupled IO devices are currently active. The OS level digital display device protective compensation process activity determination system may then transmit notification of a predicted IO device inactivity window occurrence to scaler hardware controller executing the firmware level digital display device protective compensation process activity determination system on the OLED digital display device.

In an embodiment at block 608, a scaler hardware controller may execute machine readable code instructions of a firmware level digital display device protective compensation process activity determination system to compare the last two determined zone wide pixel value averages for each pixel grid zone against one another to determine if any change in average pixel values for each pixel grid zone has exceeded a threshold change in average pixel values over the last time window. This threshold change in average pixel value represents a measurable level of OLED display screen panel activity resulting in OLED display screen panel changes, such that passive or active user activity is discerned between the last to pixel value sampling measurements. For example, in an embodiment described with reference to FIG. 3, the scaler hardware controller may execute machine readable code instructions of the firmware level digital display device protective compensation process activity determination system to sample, at scheduled pixel value measurement times, zone wide pixel value averages for each predetermined pixel grid zone 331, 332, 333, 334, 335, 341, 342, 343, 344, 345, 351, 352, 353, 354, 355, 361, 362, 363, 364, or 365. Other examples are described with respect to screen saver operation in embodiments described with respect to FIGS. 4A and 4B.

At block 610, the scaler hardware controller in an embodiment may execute machine readable code instructions of a firmware level digital display device protective compensation process activity determination system to determine whether a change in pixel values determined at block 608 for any grid zone meets or exceeds an average pixel value change threshold indicating passive or active user activity at that OLED digital display device. If the determined change in averaged pixel values for any of the pixel grid zones meets or exceeds the average pixel value change threshold, which describes the maximum allowable user activity threshold value, this may indicate passive or active user activity, such as for video streaming or for execution of an OS level application. In such a case, execution of the protective compensation process to place the OLED display screen panel in standby mode and adjust current to pixels to even out degraded pixels for the OLED digital display device could cause disruption in a currently active user's experience, and it may not be appropriate to perform such a protective compensation process at that time. The method may thus return to block 602 for routine monitoring of pixel values in the plurality of pixel grid zones to identify, by repeating the loop between block 602 and 610, a time in the future in which average pixel value change threshold is not exceeded and the user is likely inactive such that the protective compensation process may be performed without impact to user experience. If the determined change in pixel values for none of the grid zones meet or exceeds the average pixel value change threshold such that the maximum allowable user activity threshold value is not exceeded, then the OLED display screen panel is static and inactive. Such an average pixel value change threshold may be set for different pixel grid zones depending on expected passive changes located within a pixel grid zone, such as a clock or icons indicating execution or status of background software applications or systems, such that a higher average pixel value change threshold may apply to some pixel grid zones than other pixel grid zones in embodiments herein. When static pixel grid zones that do not exceed the average pixel value change threshold are detected between consecutive pixel value sampling measurements, execution of the protective compensation process to place the OLED display screen panel in a standby mode and adjust current to pixels to even out degraded pixels for the OLED digital display device may be performed with low risk of disruption to user experience. The scaler hardware controller may then be triggered to perform such a protective compensation process at that time. The method may then proceed to block 612 to prompt execution of the protective compensation process by the firmware level digital display device protective compensation system.

Upon determination of no OLED display screen panel activity exceeding average pixel value change thresholds for pixel grid zones in an embodiment at block 612, a scaler hardware controller may execute machine readable code instructions of the digital display device protective compensation system. In an embodiment in which the determined change in pixel values for none of the grid zones meet or exceed the average pixel value change threshold, this may indicate that only static images are being displayed at the OLED digital display device and there is an inferred lack of user passive or active usage of the OLED display screen panel. In such a case, execution of the protective compensation process to place the OLED display screen panel in standby mode to assess and adjust pixels as well as adjust current or voltage levels to pixels to even out any degraded pixels for the OLED display screen panel may be automatically performed with low risk of disruption to user experience.

The PMU within the OLED digital display device may manage the power provided to the components of the OLED digital display device to set setting for the pixels of the OLED display screen panel. The digital display protective compensation process routinely ceases or minimizes the delivery of power to these OLED display screen panels when placed in standby mode for short periods of time in order to assess for degraded pixels with reduced responsiveness to voltages or current for brightness of one or more color components and adjust current or voltage levels recommended for those pixels to even out degraded pixels and avoid the pixel burn-in effect described herein. Such settings for the pixels of the OLED display screen panel may be stored at the display device memory for use by the scaler hardware controller or the timing controller (TCON) for driving or operating the OLED display screen panel to display image from received video data. Thus, the scaler hardware controller in an embodiment may execute code instructions of the display device protective compensation system to direct the OLED digital display device PMU to automatically place the OLED display screen panel in standby mode and minimize power delivered thereto in order to allow for assessment and adjustment of current voltage to pixels to even out degraded pixels during the duration of a time period predicted user inactivity to avoid such burn-in effect and avoid interruption to the user. This may avoid a need to notify a user and require confirmation or avoid forced OLED protective compensation.

A scaler hardware controller in an embodiment at block 614 may execute machine readable code instructions of the firmware level digital display device protective compensation process activity determination system to determine whether the digital display device protective compensation system has aborted the protective compensation process. As described herein, execution of the protective compensation process at the OLED digital display device may involve placing the OLED display screen panel in a standby mode in order to allow for assessment and adjustment of current or voltage delivered to pixels to even out any degraded pixels to minimize or mitigate damage to the OLED digital display device panel from overuse. The scaler hardware controller of the OLED digital display device or the information handling system in an embodiment may detect when the digital display device protective compensation process has been completed and resume regular operation of the OLED display screen panel. In such a case when the digital display device protective compensation process has been successfully completed, the scaler hardware controller may provide notification to the successful digital display device protective compensation process completion to the information handling system at block 616.

However, as described with respect to embodiments herein, the scaler hardware controller executing machine readable code instructions of the firmware level digital display device protective compensation process may receive an instruction from a user via a GUI notification screen notifying the user of a pending digital display device protective compensation process or from the digital display device protective compensation process being aborted by detection of IO device activity identified during execution of the protective compensation process. More specifically, if the hardware processor executing machine readable code instructions of the OS level digital display device protective compensation process activity determination system identifies activity for IO device prior to receiving a notification from the firmware level digital display device protective compensation process activity determination system of successful completion of the display device protective compensation process, the hardware processor may execute machine readable code instructions of the OS level digital display device protective compensation process activity determination system to transmit an instruction to the firmware level digital display device protective compensation process activity determination system to abort the currently executing display device protective compensation system. The scaler hardware controller in such an embodiment may then execute machine readable code instructions of the firmware level digital display device protective compensation process activity determination system to abort or cease all processes of the digital display device protective compensation system.

At block 616, the firmware level digital display device protective compensation process activity determination system to notifies the OS level digital display device protective compensation process activity determination system of successful completion of the protective compensation process. As described in embodiments herein, this notice of successful completion of the digital display device protective compensation process may be used to confirm training of the predictive AI model for predicting time periods of user inactivity. The method may proceed to block 618 to determine whether the OLED digital display device has been powered down. If the digital display device protective compensation process was aborted at block 614, such as by IO device activity, the OS level digital display device protective compensation process activity determination system will have been triggered and can use that as training for the predictive AI model.

It may be determined in an embodiment at block 618 whether the OLED digital display device has been powered down. If the OLED digital display device has not been powered down, this may indicate a need to find a future time window in which the OLED digital display device may perform a protective compensation process to adjust current to pixels to even out degraded pixels of the OLED digital display device and prevent damage to the OLED digital display device without interrupting user experience. The method may then return to block 602 for routine gathering of display pixel data to identify when the display image is static, indicating user inactivity. By repeating the process between blocks 602 and 620, the scaler hardware controller executing machine readable code instructions of the firmware level digital display device protective compensation process activity determination system may operate at the firmware level of the OLED digital display device to schedule execution of the protective compensation process only during predicted periods of user inactivity and when detection of the OLED display screen panel inactivity is indicated. If the OLED digital display device has been powered down at block 620, the method for scheduling execution of an automatic protective compensation process to adjust current to pixels to even out degraded pixels of the OLED digital display device and prevent damage to the OLED digital display device due to prolonged use only during predicted periods of user inactivity and when the OLED display screen panel is static may then end.

The blocks of the flow diagram of FIGS. 5 and 6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those capable in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An organic light emitting diode (OLED) digital display device operating a firmware level digital display device protective compensation process activity determination system comprising: an OLED display screen panel to display images; a scaler hardware controller executing machine readable code instructions to receive notification of a future predicted input/output (IO) device inactivity window occurrence from an operating system (OS) level digital display device protective compensation process activity determination system from inputs of current or recent measurements for IO device activity for all operatively coupled IO devices to an operatively coupled information handling system into a predictive machine learning model trained on the historical IO device activity measurements for those IO devices and to output the future predicted IO device inactivity window; the scaler hardware controller to trigger executing machine readable code instructions of the firmware level digital display device protective compensation process activity determination system to routinely sample pixel value data in a plurality of pixel grid zones, where each pixel grid zone comprises a subset of plurality of pixels for the OLED display screen panel, during the received future predicted IO device inactivity window; the scaler hardware controller executing machine readable code instructions to determine a first zone wide pixel value average for each of the plurality of pixel grid zones at a first pixel value sample measurement time and a second zone wide pixel value average for each of the plurality of pixel grid zones at a second pixel value sample measurement time; the scaler hardware controller executing machine readable code instructions to compare the first zone wide pixel value average and the second zone wide pixel value average to determine any changes in pixel values for each of the plurality of pixel grid zones as a measure of OLED display screen panel activity; and the scaler hardware controller executing machine readable code instructions of a digital display device protective compensation system to automatically place the OLED digital display device in a standby mode and execute a display device protective compensation process to identify and adjust degraded pixels for the OLED display screen panel to prevent panel damage from extended use when none of the plurality of pixel grid zones has the zone wide change in pixel values that exceeds an average pixel value change threshold value.

2. The OLED digital display device of claim 1, wherein the zone wide pixel value average is an average of measured pixel values for color values across each of the subset of pixels within one pixel grid zone.

3. The OLED digital display device of claim 1, wherein each of the plurality of pixel grid zones is situated above or below a central subset of pixels set to display screen saver images.

4. The OLED digital display device of claim 1, wherein each of the plurality of pixel grid zones is situated to the left or the right of a central subset of pixels set to display screen saver images.

5. The OLED digital display device of claim 1, wherein the plurality of pixel grid zones is situated to exclude a displayed tool bar that displays a current time.

6. The OLED digital display device of claim 1 further comprising:

the scaler hardware controller executing machine readable code instructions to instruct the digital display device protective compensation system to abort the automatic execution of the digital display device protective compensation process by the scaler hardware controller when any one of the plurality of pixel grid zones has the zone wide change in pixel values that exceeds an average pixel value change threshold value during the received future predicted IO device inactivity window.

7. The OLED digital display device of claim 1 further comprising:

the scaler hardware controller executing machine readable code instructions to receive notification of the future predicted input/output (IO) device inactivity window occurrence from an operating system (OS) level digital display device protective compensation process activity determination system to limit execution of the machine readable code instructions of the digital display device protective compensation system to automatically place the OLED digital display device in the standby mode and execute the display device protective compensation process to identify and adjust degraded pixels for the OLED display screen panel to prevent panel damage to during the received future predicted IO device inactivity window.

8. The OLED digital display device of claim 1 further comprising:

the scaler hardware controller executing machine readable code instructions to receive notification of a predicted IO device inactivity window occurrence from an operating system (OS) level digital display device protective compensation process activity determination system; and the scaler hardware controller to trigger automatic execution of the display device protective compensation process at the future predicted IO device inactivity window when none of the plurality of pixel grid zones has the zone wide change in pixel values that exceeds the average pixel value change threshold value.

9. A method of scheduling automatic execution of machine readable code instructions of a digital display device protective compensation system during a predicted period of user inactivity of an organic light emitting diode (OLED) digital display device comprising:

routinely sample pixel value data, via a scaler hardware controller executing machine readable code instructions of a firmware level digital display device protective compensation process activity determination system, for a plurality of pixel grid zones of an OLED display screen panel of the OLED digital display device, where each pixel grid zone comprises a subset of plurality of pixels from a contiguous area of the OLED display screen panel;

determining, via the scaler hardware controller executing machine readable code instructions, a first zone wide pixel value average for each of the plurality of pixel grid zones at a first pixel value sample measurement time and a second zone wide pixel value average for each of the plurality of pixel grid zones at a second pixel value sample measurement time;

comparing, via the scaler hardware controller executing machine readable code instructions, the first zone wide pixel value average and the second zone wide pixel value average to determine any changes in pixel values for each of the plurality of pixel grid zones as a measure of OLED display screen panel activity;

determining, at the scaler hardware controller executing machine readable code instructions, notification of a future predicted input/output (IO) device inactivity window occurrence from an operating system (OS) level digital display device protective compensation process activity determination system from inputs of current of recent measurements for IO device activity for all operatively coupled IO devices to an operatively coupled information handling system with the OLED digital display device into a predictive machine learning model trained on the historical IO device activity measurements for those IO devices and to output the future predicted IO device inactivity window;

placing an OLED digital display device in a standby mode and automatically executing, via the scaler hardware controller, a display device protective compensation system to identify and adjust degraded pixels for the OLED display screen panel to prevent panel damage from extended use when none of the plurality of pixel grid zones has the zone wide change in pixel values that exceeds an average pixel value change threshold value that is limited to occurring during the received future predicted IO device inactivity window; and aborting the automatic execution of the digital display device protective compensation system by the scaler hardware controller when any one of the plurality of pixel grid zones has the zone wide change in pixel values that exceeds an average pixel value change threshold value.

10. The method of claim 9, wherein the zone wide pixel value average is an average pixel value across the subset of pixels within the pixel grid zone.

11. The method of claim 9 further comprising:

receiving notification of the future predicted input/output (IO) device inactivity window occurrence from an operating system (OS) level digital display device protective compensation process activity determination system from the operatively coupled information handling system to trigger execution of the machine readable code instructions of the firmware level digital display device protective compensation process activity determination system to routinely sample the pixel value data for the plurality of pixel grid zones during the received future predicted IO device inactivity window.

12. The method of claim 9 further comprising:

receiving notification of the future predicted IO device inactivity window occurrence based on the trained machine learning model that is an AI predictive model and tracked IO device activity measurements from an operating system (OS) level digital display device protective compensation process activity determination system; and triggering automatic execution, via the scaler hardware controller, of the display device protective compensation system during the future predicted IO device inactivity window when none of the plurality of pixel grid zones has the zone wide change in pixel values that exceeds the average pixel value change threshold value during the received future predicted IO device inactivity window.

13. The method of claim 9 further comprising:

receiving notification of the future predicted input/output (IO) device inactivity window occurrence from an operating system (OS) level digital display device protective compensation process activity determination system at an operatively coupled information handling system, where the future predicted input/output (IO) device inactivity window occurrence indicates a start time and duration of the predicted input/output (IO) device inactivity window occurrence.

14. The method of claim 9 further comprising:

instructing the digital display device protective compensation system, via the scaler hardware controller executing machine readable code instructions, to halt a digital display device protective compensation process currently being executed by the scaler hardware controller when the scaler hardware controller receives notice of an updated IO device activity measurement indicating user activity during the predicted IO device inactivity window from the operatively coupled information handling system during the received future predicted IO device inactivity window.

15. An organic light emitting diode (OLED) digital display device operating a firmware level digital display device protective compensation process activity determination system comprising:

an OLED display screen panel to display images received in video data from an operatively coupled information handling system;

a scaler hardware controller executing machine readable code instructions to receive determination of a future predicted input/output (IO) device inactivity window occurrence based from execution of a trained AI predictive model with inputs of tracked IO device activity measurements from IO device inputs tracked by an operating system (OS) level digital display device protective compensation process activity determination system at the operatively coupled information handling system, and to trigger automatic execution of a digital display device protective compensation system for the OLED digital display device only during the received future predicted IO device inactivity window;

the scaler hardware controller executing machine readable code instructions of the firmware level digital display device protective compensation process activity determination system to routinely sample pixel value data in a plurality of pixel grid zones, where each pixel grid zone comprises a subset of plurality of pixels for the OLED display screen panel;

the scaler hardware controller executing machine readable code instructions to determine a first zone wide pixel value average for each of the plurality of pixel grid zones at a first pixel value sample measurement time and a second zone wide pixel value average for each of the plurality of pixel grid zones at a second pixel value sample measurement time;

the scaler hardware controller executing machine readable code instructions to determine any changes in pixel values between the first pixel values sample measurement time and the second pixel value sample measurement time for each of the plurality of pixel grid zones as a measure of OLED display screen panel activity; and the scaler hardware controller executing machine readable code instructions of a digital display device protective compensation system to automatically execute the display device protective compensation process when none of the plurality of pixel grid zones has the zone wide change in pixel values that exceeds an average pixel value change threshold value only during the received future predicted IO device inactivity window.

16. The information handling system of claim 15, wherein the IO device activity measurements include mouse or touchpad movement or keyboard key presses for a mouse, a touchpad, or a keyboard interacting with the information handling system operatively coupled to the OLED digital display device.

17. The information handling system of claim 15 further comprising:

the scaler hardware controller to transmit notification of completion of the digital display device protective compensation process to the operatively coupled information handling system to retrain the trained AI predictive model based on accurate prediction of the future predicted IO device inactivity window.

18. The information handling system of claim 15 further comprising:

the scaler hardware controller executing machine readable code instructions to instruct the digital display device protective compensation system to abort the automatic execution of the digital display device protective compensation process by the scaler hardware controller when any one of the plurality of pixel grid zones has the zone wide change in pixel values that exceeds an average pixel value change threshold value or an updated IO device activity measurement is received that indicates user activity during the during the received future predicted future time IO device inactivity window.

19. The information handling system of claim 18 further comprising:

the scaler hardware controller to transmit notification of abortion of the digital display device protective compensation process to the operatively coupled information handling system to retrain the trained AI predictive model based on inaccurate prediction of the predicted IO device inactivity window.

20. The information handling system of claim 15 further comprising:

the scaler hardware controller to receive notice of an updated IO device activity measurement indicating user activity during the future predicted IO device inactivity window from the operatively coupled information handling system and an instruction to the scaler hardware controller at the OLED digital display device to halt the digital display device protective compensation process.

* * * * *